US007870439B2

(12) United States Patent
Fujiyama et al.

(10) Patent No.: US 7,870,439 B2
(45) Date of Patent: Jan. 11, 2011

(54) FAULT TOLERANT MULTI-NODE COMPUTING SYSTEM USING PERIODICALLY FETCHED CONFIGURATION STATUS DATA TO DETECT AN ABNORMAL NODE

(75) Inventors: Kenichiro Fujiyama, Tokyo (JP); Nobutatsu Nakamura, Tokyo (JP)

(73) Assignee: NEC Corporation (JP)

( * ) Notice: Subject to any disclaimer, the term of this patent is extended or adjusted under 35 U.S.C. 154(b) by 1408 days.

(21) Appl. No.: 10/854,534

(22) Filed: May 26, 2004

(65) Prior Publication Data

US 2004/0255185 A1    Dec. 16, 2004

(30) Foreign Application Priority Data

May 28, 2003    (JP)    ............................... 2003-150932

(51) Int. Cl.
G06F 11/00    (2006.01)
(52) U.S. Cl. .......................................... 714/47; 714/11
(58) Field of Classification Search .................... 714/4, 714/11, 12, 37, 55, 47
See application file for complete search history.

(56) References Cited

U.S. PATENT DOCUMENTS

| | | | | |
|---|---|---|---|---|
| 5,193,181 A | * | 3/1993 | Barlow et al. .................... 714/2 |
| 5,317,722 A | * | 5/1994 | Evans ........................... 717/170 |
| 5,664,093 A | * | 9/1997 | Barnett et al. .................. 714/31 |
| 5,740,359 A | * | 4/1998 | Hasegawa et al. ............... 714/47 |
| 5,802,266 A | * | 9/1998 | Kanekawa et al. .............. 714/11 |
| 6,014,669 A | * | 1/2000 | Slaughter et al. ............... 707/10 |
| 6,173,416 B1 | * | 1/2001 | Liddell et al. .................. 714/11 |
| 6,636,818 B1 | * | 10/2003 | Lawrence ...................... 702/83 |
| 6,754,845 B2 | * | 6/2004 | Kursawe et al. ................ 714/4 |
| 6,836,750 B2 | * | 12/2004 | Wong et al. ................... 702/186 |
| 7,024,594 B2 | * | 4/2006 | Pignol ........................... 714/54 |

(Continued)

FOREIGN PATENT DOCUMENTS

JP    4-149743    5/1992

(Continued)

OTHER PUBLICATIONS

"Fault Tolerance by Design Diverstiy: Concepts and Experiments" Avizienis et al., IEEE, 1984, pp. 67-80.

(Continued)

Primary Examiner—Robert Beausoilel
Assistant Examiner—Elmira Mehrmanesh
(74) Attorney, Agent, or Firm—Hayes Soloway P.C.

(57) ABSTRACT

A fault tolerant computing system comprises a plurality of processing nodes interconnected by a communication medium for parallel-running identical application programs. A fault detector is connected to the processing nodes via the communication medium for periodically collecting configuration status data from the processing nodes and mutually verifying the collected configuration status data for detecting an abnormal node. In one preferred embodiment of this invention, the system operates in a version diversity mode in which the processing nodes are configured in a substantially equal configuration and the application programs are identical programs of uniquely different software versions. In a second preferred embodiment, the system operates in a configuration diversity mode in which the processing nodes are respectively configured in uniquely different configurations. The configurations of the processing nodes are sufficiently different from each other that a software fault is not simultaneously activated by the processing nodes.

33 Claims, 13 Drawing Sheets

U.S. PATENT DOCUMENTS

| | | | |
|---|---|---|---|
| 7,111,205 B1* | 9/2006 | Jahn et al. | 714/47 |
| 7,237,140 B2* | 6/2007 | Nakamura et al. | 714/4 |
| 7,237,239 B1* | 6/2007 | Goel et al. | 717/170 |
| 7,320,127 B2* | 1/2008 | Banks et al. | 717/168 |
| 7,363,656 B2* | 4/2008 | Weber et al. | 726/23 |
| 7,418,470 B2* | 8/2008 | Howard et al. | 709/201 |
| 2001/0025312 A1 | 9/2001 | Obata | 709/226 |
| 2002/0046365 A1* | 4/2002 | Avizienis | 714/43 |
| 2003/0191989 A1* | 10/2003 | O'Sullivan | 714/47 |
| 2004/0205374 A1* | 10/2004 | Poletto et al. | 714/4 |
| 2008/0168356 A1* | 7/2008 | Eryurek et al. | 715/736 |

FOREIGN PATENT DOCUMENTS

| | | |
|---|---|---|
| JP | 06-342369 | 12/1994 |
| JP | 07-306794 | 11/1995 |
| JP | 9-212467 | 8/1997 |
| JP | 9-305552 | 11/1997 |
| JP | 9-311733 | 12/1997 |
| JP | 10-49219 | 2/1998 |
| JP | 10-283215 | 10/1998 |
| JP | 2000-276454 | 10/2000 |
| JP | 2001-101149 | 4/2001 |
| JP | 2001-202346 | 7/2001 |
| JP | 2001-209627 | 8/2001 |
| JP | 2001-331348 | 11/2001 |
| JP | 2002-32243 | 1/2002 |
| JP | 2002-259147 | 9/2002 |

OTHER PUBLICATIONS

"Distributed Execution of Recovery Blocks: An Approach for Uniform Treatment of Hardware and Software Faultsin Real-Time Applications" Kim et al., IEEE Transactions on Computers, vol. 38, No. 5, 1989, pp. 626-636.

* cited by examiner

FAULT TOLERANT MULTI-NODE COMPUTING SYSTEM USING PERIODICALLY FETCHED CONFIGURATION STATUS DATA TO DETECT AN ABNORMAL NODE

BACKGROUND OF THE INVENTION

1. Field of the Invention

The present invention relates generally to a multi-node computing system and more specifically to a software-fault tolerant multi-node computing system and a method of enhancing the fault tolerance of a computing system at the level of its software element.

2. Description of the Related Art

Fault tolerant computing systems are known in the computer technology to cope with a system error. Usually, the fault tolerant computing system is one in which a plurality of identical modules are connected to a common bus. All applications are divided into a number of tasks of suitable size and each module is assigned the same task. All the tasks are simultaneously executed by the modules. Through the common bus, each module reads the result of the execution performed by other modules to which the same tasks are assigned and takes a majority decision for masking a system error of any of these modules. However, the presence of a software fault results in a premature ending of the program known as abnormal end.

In a fault tolerant client-server system as described in Japanese Patent Publication 1995-306794, a client process transmits job requests to all server processes and test execution commands to all error-detection processes. Each server processes the job request and runs a test on the process and returns a response to the client process. On receiving all responses from the servers, the client process produces an output based on a majority decision on the process results as well as on the test results.

A technical paper "Fault Tolerance by Design Diversity: Concepts and Experiments" (A. Avizienis and John P. J. Kelly, IEEE Computer Society. Vol. 17, No. 8, August 1984, pages 67-80) describes a fault tolerance scheme in which a plurality of different versions of an identical application program are independently designed by different developers. These independently designed different software versions are simultaneously executed in parallel. By taking a majority decision from the results of the parallel computations, a software error in one of these programs is masked. However, the development cost of this version diversity technique is prohibitively high.

Japanese Patent Publication 1994-342369 discloses a version diversity parallel-running computing system. To develop many different versions of a program at a low cost as possible, an application program is divided into a number of software modules according to different functions. For each software module, a number of different versions are developed and different versions of different functional modules are combined. For example, if a program is divided into modules A, B and C and for each module two versions are developed, yielding modules $A_1, A_2, B_1, B_2, C_1$ and $C_2$. These modules are combined to develop a total of eight sets of modules $\{A_1, B_1, C_1\}$, $\{A_1, B_1, C_2\}$, $\{A_1, B_2, C_1\}$, $\{A_1, B_2, C_2\}$, $\{A_2, B_1, C_1\}$, $\{A_2, B_1, C_2\}$, $\{A_2, B_2, C_1\}$ and $\{A_2, B_2, C_2\}$ at a cost equivalent to the cost of developing two versions of a program.

A technical article "Distributed Execution of Recovery Blocks An Approach for Uniform Treatment of Hardware and Software Faults in Real-Time Applications" (K. H. Kim, Howard O. Welch, IEEE Transactions on Computers, Vol. 38, No. 5, pp: 626-636, 1989) describes a recovery block system to verify the processing result of a program. Similar to version diversity systems, a number of different versions of a program are developed and different ranks are accorded to the developed versions respectively. The program of the highest rank is first executed and the result of the execution is checked with an algorithm called "acceptance test". If verified, the result is selected. If not, the program of the second highest rank is then executed and its result is selected.

Also known is the ping-pong system of conventional computers which uses the heart-beat signal for regularly checking their operation.

However, one shortcoming of the prior art fault tolerance techniques is that, since the failure detection is performed only after results are obtained from all processing nodes, an abnormal node cannot quickly be detected before all processing results are obtained. If the ping-pong system is used, a node failure may be detected instantly when there is no "pong" response at all. However, it is impossible to provide an early warning signal when an abnormal node is present in a multi-node computing system.

Therefore, there exists a need for a fault tolerant parallel-running computing system capable of detecting an abnormal node well prior to the time all processing nodes produce their results. Further, a failure of discovering early symptom of a node failure would result in a useless consumption of system resource as well as an increase in the execution cost. If the potential cause of a trouble goes unnoticed for an extended period of time, the trouble would grow and propagate to properly operating nodes of the system and adversely affect its fault tolerance.

SUMMARY OF THE INVENTION

It is therefore an object of the present invention for detecting an early symptom of a possible abnormal node in a multi-node parallel-running computing system before processing results are obtained from all nodes of the system.

Another object of the present invention is to prevent a multi-node parallel-running computing system from being adversely affected by a prolonged operation of an abnormal node.

A further object of the present invention is to provide a fault-tolerant multi-node parallel-running computing system which is less costly to develop application programs and less costly to execute an application program.

According to as first aspect of the present invention, there is provided a fault tolerant computing system comprising a plurality of processing nodes interconnected by a communication medium for parallel-running a plurality of identical application programs, and a fault detector connected to the processing nodes via the communication medium for periodically collecting configuration status data from the processing nodes and mutually verifying the configuration status data of the processing nodes with each other for detecting an abnormal node.

The processing nodes are diversified unintentionally due to their inherent variability due to different manufacturing processes or aging characteristics. Preferably, the processing nodes are diversified intentionally. In one embodiment of this invention, the system operates in a version diversity mode in which the processing nodes are configured in a substantially equal configuration and the application programs are identical programs of uniquely different software versions.

In another embodiment, the system operates in a configuration diversity mode in which the processing nodes are respectively configured in uniquely different configurations.

The configurations of the processing nodes are sufficiently different from each other that a software fault is not simultaneously activated by the processing nodes.

According to a second aspect of the present invention, a management node is provided for a computing system which comprises a plurality of processing nodes interconnected by a communication medium for parallel-running a plurality of identical application programs. The management node comprises means for periodically collecting configuration status data from the processing nodes via the communication medium, and a fault detector for mutually verifying the fetched configuration status data of the processing nodes with each other for detecting an abnormal node.

According to a third aspect of the present invention, a fault tolerant processing node is provided for a computing system in which the processing node is one of a plurality of processing nodes interconnected by a communication medium for parallel-running a plurality of identical application programs. The processing node comprises means for periodically collecting configuration status data from other processing nodes of the computing system via the communication medium, and a fault detector for verifying configuration status data of the processing node with the configuration status data collected from the other processing nodes for detecting an abnormal node.

According to a fourth aspect of the present invention, a method is provided for parallel-running a plurality of processing nodes interconnected by a communication medium. The method comprises (a) setting a plurality of identical application programs into the processing nodes, (b) periodically collecting configuration status data from the processing nodes, and (c) mutually verifying the collected configuration status data of the processing nodes with each other for detecting an abnormal node.

BRIEF DESCRIPTION OF THE DRAWINGS

The present invention will be described in detail further with reference to the following drawings, in which.

DETAILED DESCRIPTION

Figure 1:
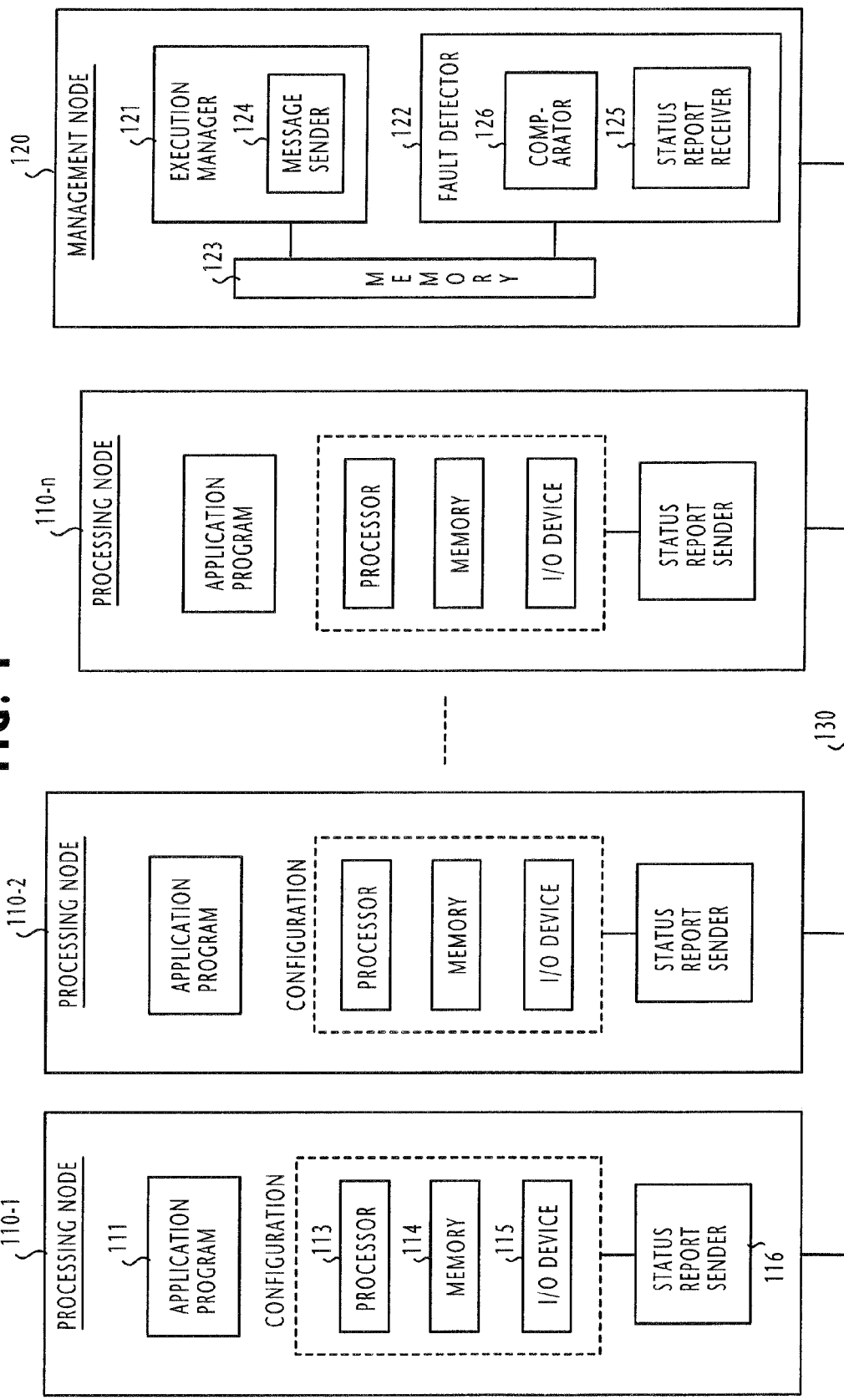
FIG. 1 is a block diagram of a computing system according to a first embodiment of the present invention.

Referring to FIG. 1, there is shown a fault tolerant parallel-running computing system according to a first embodiment of the present invention. The computing system comprises a plurality of processing nodes 110-1~110-n and a management node 120. All processing nodes and the management node are inter-connected via a common communication medium 130 which may be a serial or parallel bus, wireline or wireless LAN, WAN, the Internet or a public switched network, or a combination of theses. Each of the processing nodes 110 comprises a processor 113, a memory 114 and an input/output device 115, all of which are combined to form an operational environment, or configuration.

An application program 111 is installed in each processing node. For operating the processing nodes in a parallel running mode, the application programs 111 of all processing nodes are identical to each other in terms of functionality, but are uniquely different from every other nodes in terms of software version number.

In each processing node, various items of its configuration (both software and hardware) are initially set by the application program 111 according to configuration data supplied from the management node 120 so that the configurations of all processing nodes are substantially identical to each other. Each application program 111 receives a job request message from the management node 120, and processes the request and returns a response message to the management node 120. When the status report sender 116 is requested by the management node 120 via the communication medium 130, it replies with configuration status information.

Management node 120 is generally comprised of an execution manager 121, a fault detector 122 and a memory 123 which stores configuration data for setting all processing nodes in substantially same configurations. Execution manager 121 has the functions of (a) distributing job requests of same instruction to all processing nodes, (b) processing node responses to produce a system output, (c) performing a fault-recovery process on the output of the fault detector 122 and (d) setting the configurations of all processing nodes according to the configuration data stored in the memory 123.

In the first embodiment, the execution manager 121 includes a message sender 124 for transmitting a report message to the outside of the system for communicating the system's operating state to the user. Fault detector 122 includes a status report receiver 125 and a comparator 126. At periodic intervals, the status report receiver 125 requests status reports from the status report senders 116 of all nodes via the communication medium 130 and stores the received status reports into the memory 123. Comparator 126 reads the configuration items of each node from the memory and verifies all status reports by comparing the configuration data of each node with corresponding data of every other node. The result of the verification is stored in the memory 123. Execution manager 121 reads the result of the verification from the memory 123. If the configuration items of a processing node differ significantly from the other nodes, that processing node is considered as faulty. The identity of the faulty processing node is communicated from the message sensor 124 to the user.

Each of the processing nodes 110 and the management node 120 may be implemented with a physical machine such as a personal computer or a cell of a main-frame computer, or a virtual machine, or a combination of physical and virtual machines.

Figure 2:
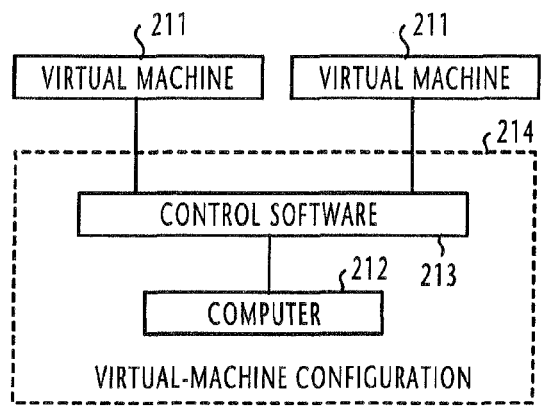
FIG. 2 is a block diagram of processing nodes implemented with virtual machines.

FIG. 2 shows a number of virtual machines 211 implemented on a virtual machine configuration 214 which is comprised of a physical computer 212 and a control program 213 called a virtual machine monitor. The logical operation of each virtual machine is exactly the same as the physical machine. Within the virtual machine configuration 214, one or more virtual machine 211 may be implemented and the individual devices of each virtual machine 211 are specified by files resident on the computer 212. The processor, memory and input/output devices of each virtual machine 211 are called virtual resources. The basic function of control program 213 of each virtual machine 211 includes the mapping of the virtual resources of the virtual machine to the physical resources of the computer 212. Being implemented by software, a virtual machine can be instantly created or perished, whenever necessary. If the processing nodes are implemented by virtual machines to realize a wide variety of computing configurations, it is not necessary to provide many hardware modules as permanent installations, and hence a significant cost reduction can be achieved.

Figure 3:
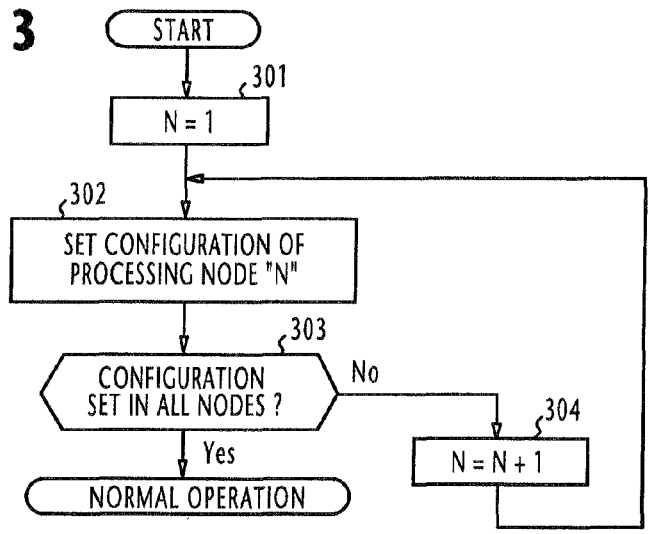
FIG. 3 is a flowchart of the operation of the management node of FIG. 1 when configuration data is set into each of the processing nodes under control of a management node.

FIG. 3 is a flowchart of the operation of the execution manager 121 of management node 120.

When the system is started, the management node 120 initializes a node-identifying variable N to 1 at step 301, and proceeds to step 302 to establish configuration parameters in the processing node N. Management node repeats step 302 until configuration parameters are established in a predetermined number (at least three) of processing nodes (step 303). Otherwise, the variable N is incremented by 1 at step 304 and flow returns to step 302. When configuration parameters are established in all the predetermined number of processing nodes, the processing nodes of the system are now ready to perform a parallel-run operation.

The following is a detailed description of step 302.

(a) If the processing node is a physical machine, the execution manager 121 sends a power-on signal to one of the processing nodes 110 which is specified by the variable N. In response, the application program of the specified node sends an enquiry message to the execution manager 121 requesting its node configuration data. In response to the enquiry message, the execution manager 121 reads the node configuration data of the requesting node from the memory 123 and sends it to the requesting node. Application program 111 of the requesting node uses the received data to establish its own node configuration. Specifically, if the processing node is a personal computer, the received configuration data is saved in its BIOS (basic input/output system) and the personal computer is rebooted to start the application program 111. Due to the diversified software versions of application programs 111, each of the processing nodes 110 of the substantially same configuration can be said to run under uniquely different software environment.

(b) If the processing node is a virtual machine, the execution manager 121 specifies a file in a physical machine that implements the virtual machine. Execution manager 121 reads the node configuration data of the virtual machine from the memory 213 and updates the specified file with this configuration data and starts up the virtual machine. When the virtual machine is activated, the application program 111 is started.

(c) Alternatively, a plurality of processing nodes of either physical or virtual machine may be provided. In this case, the execution manager 121 selects those processing nodes whose configurations are substantially identical to each other but whose software versions of application programs are uniquely different from each other. If the selected processing node is a physical machine, the execution manager 121 sends a power-on signal to the selected physical machine. If the selected node is a virtual machine, the execution manager 121 sends an instruction to the selected virtual machine to start its process.

During normal operation, the execution manager 121 monitors system operation for an end instruction for terminating system operation, a request for a new job to be processed by the nodes 110 and job responses from the nodes.

If an end instruction of the whole system is issued as an event trigger from a manual input of the system operator or from a timer, the execution manager 121 informs each processing node 110 of this event by issuing a control command according to the configuration data of each processing node stored in the memory 123. As a result, each processing node may shut it down by turning off its uninterrupted power source and performing a Suspend-To-RAM (i.e., the processing node stops executing its program while holding its main (virtual) memory).

If a job request is newly generated, the execution manager 121 distributes command messages to all processing nodes 110 so that the request is processed concurrently by their application programs 111. When the requests are processed by all nodes, the execution manager 121 makes a majority decision on job responses from nodes except a faulty node, if present, and produces a system output. If the application program 111 is of the type whose output is other than a numerical value obtained from numerical computations, the execution manager 121 selects one of job responses from nodes except the one identified as faulty, if present, instead of using the majority decision algorithm.

Figure 4:
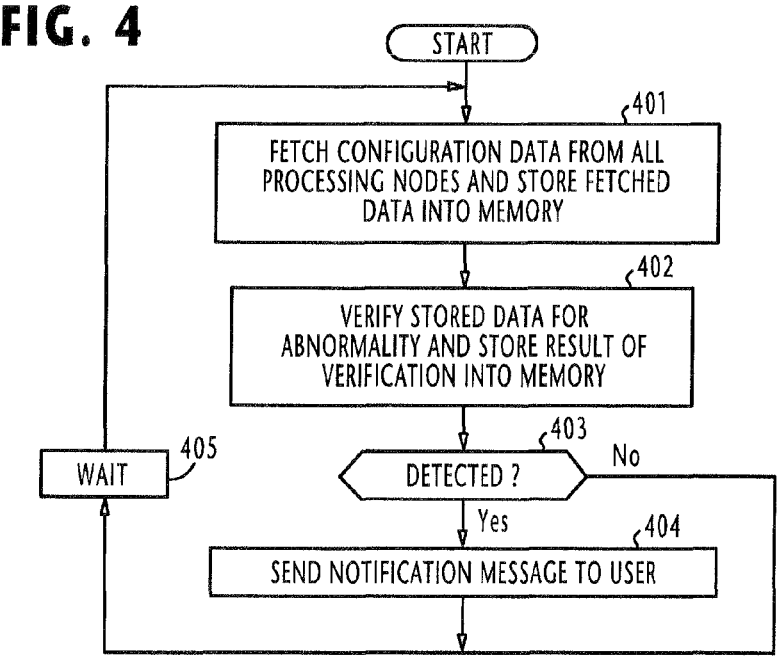
FIG. 4 is a flowchart of the operation of the management node according to the first embodiment of this invention.

According to the first embodiment of the present invention, the execution manager 121 repeatedly executes the routine of FIG. 4 at periodic intervals. In each routine of FIG. 4, the status report receiver 126 initially fetches configuration items from all processing nodes and stores the fetched data in the memory 123 (step 401).

More specifically, the management node 120 fetches the configuration status information by issuing a command to the status report sender 116 of each processing node following a log-in process. Alternatively, the status report sender 116 of each node is implemented with a service processor from which the status report receiver 126 fetches configuration management node. Management node 120 analyzes the status report from each processing node. The status report is formulated with information which may be selected from the following hardware- and software-related configuration status information items (a) through (j):

a) Processor's operating state
b) Running state of operating process
c) Usage of memory
d) Usage of cache
e) Usage of virtual memory
f) Usage of swap files
g) Usage of disk
h) Input/output interfaces
i) Network state
j) Device temperatures The processor's operating state (a) data includes ($a_1$) processor's load average which can be obtained by analyzing the results of "uptime" command or "top" command, and ($a_2$)

number of processes operating under the processor which can be obtained by analyzing the response of a "ps" command or "top" command.

The running state of operating process (b) data includes the following items:

$b_1$) States of the process including running, sleeping in an interruptible wait, waiting in uninterruptible desk sleep, zombie, traced, stopped, and paging $b_2$) Memory area used by the process $b_3$) Load average of the process $b_4$) Run time of the process (User mode/kernel mode)

$b_5$) Priority of the process $b_6$) Amount of memory consumed by the process $b_7$) Size of virtual memory assigned to the process $b_8$) Number of page faults of the process (major fault/minor fault)

$b_9$) Number/size of read-write accesses from the process to disk $b_{10}$) Bit map of signals If the process is identified by "xxxx", these configuration items can be retrieved from virtual files "/proc/xxxx/stat", "/proc/xxxx/status" and "/proc/xxxx/stam".

The usage of memory (c) data includes ($c_1$) memory size and ($c_2$) amount of memory currently in use. These items can be obtained by analyzing the response of a "free" command or "top" command, or examining "/proc/meminfo".

The usage of cache (d) data includes ($d_1$) cache size and ($d_2$) cache hit rate. These items can be obtained by analyzing the response of a "free" command or examining "/proc/meminfo".

The usage of virtual memory (e) data includes ($e_1$) virtual memory size and ($e_2$) amount of virtual memory currently in use. These items can be obtained by analyzing the response of a "free" command or a "top" command, or examining "/proc/meminfo".

The usage of swap files (f) data includes ($f_1$) swap size which can be obtained by analyzing the response of a "free" command or a "top" command, or examining "/proc/meminfo" and ($f_2$) number of swapped pages which can be obtained by summing the number of page faults that occur in each process.

The usage of disk (g) data includes ($g_1$) disk size and ($g_2$) amount of disk space currently in use. These items can be obtained by analyzing the response of a "df" command.

The input/output interfaces (h) data includes ($h_1$) presence/absence of devices (IDE, SCSI, PCI, NIC) and ($h_2$) operating (working or not working) state of each device. These items can be obtained by analyzing the response of a "lspci" command. In the case of NIC, detailed information can be obtained by executing an "ifconfig" command.

The network state (i) data includes ($i_1$) presence/absence of established connection and ($i_2$) number of both transmit and receive packets. These items can be obtained by analyzing the response of an "ifconfig" command.

The device temperatures (j) data includes the temperature of the processor. If the processor is BIOS-compatible, the processor's temperature can be obtained by referencing "/proc/cpuinfo". Other temperatures include the temperature of power supply unit and the internal temperature of the machine.

Following step 401, the comparator 125 reads the stored configuration status data from the memory 123 and compares the status data item-by-item between each node and every other node (step 402). If the comparator 125 detects a node whose configuration status data significantly differs from those of every other node, it identifies the node as an abnormal node (step 403) and stores this identity in the memory 123.

For example, if abnormal ends occur frequently in some node, the number of "zombie" states would become higher than other nodes. If the application program of a node enters into the state of endless loop, the processor's load average of that node would become higher than other nodes. If a process fork of some node enters into the state of endless loop, the number of processes of that node would become higher in comparison with other nodes. If a bug of memory leak occurs in a node, the consumption of both physical and virtual memories and the number of swaps would increase in that node to a level higher than other nodes. If a number of log-ins has increased excessively in a node due to some abnormality, the amount of its disk space in use would become higher than other nodes. If a node is afflicted with a worm-type virus, the number of packets transmitted from that node would increase to a level higher tan other nodes. If the processor of a node hung due to heat, the temperature of the processor would be higher than normally operating nodes. To detect an abnormal node, the comparator 125 uses some empirical rule such as majority decision or outlier detection as described in articles "Detecting Cellular Fraud Using Adaptive Prototypes", P. Burge, J. Shawe-Taylor, Proceedings of AI Approaches to Fraud Detection and Risk Management, pp: 9-13, 1997 and "On-line Unsupervised Outlier Detection Using Finite Mixtures with Discounting Learning Algorithms", K. Yamanishi et al, Proceedings of the 6th ACM SIGKDD International Conference on Knowledge Discovery and Data Mining, ACM Press, pp: 320-324, 2000. A total value of weighted values of configuration status data may also be used for assessing the node performance.

If a abnormal node has been detected by the comparator 125, the execution manager 121 reads the identity of the abnormal node from the memory 123 and transmits a notification message (such as E-mail) from the message sender 124 to the user or any other system which utilizes this message (step 404). A notification message may not only be transmitted when an abnormal node is detected, but transmitted for the purpose of communicating a result of comparisons. Following the execution of step 404, the execution manager 121 waits a predetermined interval (step 405) before returning to step 401 to repeat the routine.

Instead of the software-version diversity, the computing system of the present invention is modified so that the configurations of all processing nodes 110 are diversified. In this embodiment, the software versions of their application program may be either diversified as described above, However, it is advantageous for the management node 120 for setting all processing nodes with common application programs if their versions are unified.

In order to prevent each processing node from activating a particular software fault in its program 111 under a particular running state simultaneously with the other processing nodes, it is preferable that the difference between the configurations of any two processing nodes be as large as possible. If the main memory sizes of any two processing nodes differ by several tens of bytes at best while the other configuration parameters are of equal value, such a difference is too small to prevent the processing nodes from concurrently activating their program bugs. Therefore, the configuration parameters of any two of the processing nodes 110 are set to differ from each other by more than a predetermined value. The method employed in this embodiment is a configuration diversity software fault tolerance.

In the configuration-diversity computing system, each processing node uses the same or different version of an identical application program and the configuration of each processing node differs uniquely from other nodes. The configuration of each node includes hardware configuration, software configuration, external device configuration and program startup configuration. If at least one of these configurations of each node differs uniquely from other processing nodes, the system can be operated in a configuration diversity mode.

The hardware configuration includes main memory size, virtual memory size, memory access timing processor operating speed, bus transmission speed, bus width, number of processors, read cache memory size, write cache memory size, cache's valid/invalid status, and types of processors and memories. In this specification, the term "hardware configuration parameter" is defined to specify a particular hardware configuration. If at least one of these hardware configuration parameters of a given processing node is different from those of other processing nodes, the given processing node is said to operate in a uniquely different hardware configuration.

The software configuration includes Operating Systems, basic software, various device drivers, and various library versions. The basic software includes the normally executed software packages, which significantly affect the operation of the computer program, such as the Internet browser, firewalls, and virus checkers. The device drivers include a disk driver and the libraries include a dynamic link library. The software configuration further includes the use/nonuse of modifying patches and security patches, and the setting of configuration files, such as registry, security policy and access policy, that specify the operation of the OS, the basic software and the libraries. In this specification, the term "software configuration parameter" is defined to specify a particular software configuration. If at least one of these software configuration parameters of a given processing node is different from those of other processing nodes, the given processing node is said to operate in a uniquely different software configuration.

The external device configuration includes the types of external devices connected to a computer, such as the external disk drive, the display unit, the input/output device, and the communication device or interface. Serial ports, displays, hard disks, networks, keyboards, pointing devices, tablets, printers and loudspeakers constitute different external device configurations. In this specification, the term "external device configuration parameter" is used to specify a particular external device configuration. If at least one of these external device configuration parameters of a given processing node is different from those of other processing nodes, the given processing node is said to operate in a uniquely different external device configuration.

The program startup configuration includes different methods of starting an application program, such as (a) interruption and reboot of an application program by suspending the CPU while holding the contents of the main memory (known as Suspend-to-RAM), (b) interruption and reboot of an application program by saving the contents of the main and virtual memories on a hard disk, suspending the OS and restoring the saved memory contents when the OS is restarted (known as Suspend-to-Disk), (c) interruption and reboot of an application program by suspending and restarting the OS, (d) interruption and reboot of an application program by forcibly interrupting and restarting the program and the OS, (e) restarting of a computer program and the OS after reinstalling the program and the OS, and (f) restarting the application program and the OS after performing a clear install of the program and the OS. In this specification, the term "program startup configuration parameter" is defined to specify a particular startup configuration of an application program.

The memory 123 of management node 120 includes a configuration definition area for uniquely setting the configuration of each processing node 110. Each processing node receives the configuration parameters of its own node from the execution manager 121 to uniquely establish its own configuration when the execution manager 121 performs the initialization process as previously described with reference to FIG. 3. In this initialization process, the execution manager 121 sets all processing nodes with the same software version of an application program 111, instead of the diversified software versions of the previous embodiments. Each processing node runs the unified version of the application program 111 in parallel with other processing nodes 110.

If the degree of difference in node configuration between any two processing nodes X and Y is denoted as $D_{XY}$, the following relation can be established:

$$D_{XY} = aD_H + bD_S + cD_G + dD_K \quad (1)$$

where, $D_H$ represents the degree of difference in hardware configuration between the nodes X and Y, $D_S$ representing the degree of difference in software configuration between the nodes X and Y, $D_G$ representing the degree of difference in external device configuration between the nodes X and Y, and $D_K$ representing the degree of difference in program startup configuration between the nodes X and Y, and a, b, c, d are weighting variables. If the weighting variables a, b, c, d are of equal value, fairness could be guaranteed for the respective configurations, and if a greater value is used for the weighting variable of a given configuration, the degree of difference of the given configuration could be emphasized. These weighting variables are determined by experiments and analysis of computer resource usage.

The degree of difference in hardware configuration $D_H$ between nodes X and Y is given by:

$$D_H = h_1|D_{HX1} - D_{HY1}| + h_2|D_{HX2} - D_{HY2}| + \ldots + h_r|D_{HXr} - D_{HYr}| \quad (2)$$

where, $D_{HXi}$ (i=1, 2, . . . , r) is the i-th parameter of the hardware configuration of node X, $D_{HYi}$ is the i-th parameter of the hardware configuration of node Y, and $|D_{HXi} - D_{HYi}|$ is the degree of difference in the i-th hardware configuration parameter between nodes X and Y. For example, the degree of difference in the i-th hardware configuration (e.g. memory 6) parameter may be determined as "0" (i.e., there is no substantial difference) if the memories 6 of nodes X and Y differ in size by less than multiple 2, as "1" if they differ by a multiple in the range between 2 and 4, and as "2" if they differ by a multiple in the range between 4 and 8. In the case of processors 5, the degree of difference may be determined as "0" if the types and the version numbers of processors 5 are equal to each other, as "1" if the types of their processor are equal but their version numbers are different, and as "2" if the types of their processor are different. In the cache's valid/invalid status parameter where only two values can be taken, the degree of difference may be determined as "0" if the nodes X and Y assume the same cache state, and as "1" if they assume different cache states. $h_i$ (i=1, 2, . . . , r) is a weighting variable. If the weighting variables $h_i$ are of equal value, fairness could be guaranteed for the respective hardware configuration parameters, and if a greater value is used for the weighting variable of a given hardware configuration parameter, the degree of difference of the given parameter could be emphasized. These weighting variables are determined by experiments and analysis of computer resource usage.

The degree of difference in software configuration $D_S$ between nodes X and Y is given by:

$$D_S = s_1|D_{SX1} - D_{SY1}| + s_2|D_{SX2} - D_{SY2}| + \ldots + s_s|D_{SXs} - D_{SYs}| \quad (3)$$

where, $D_{SXi}$ (i=1, 2, . . . , s) is the i-th parameter of the software configuration of node X, $D_{SYi}$ is the i-th parameter of the software configuration of node Y, and $|D_{SXi}-D_{SYi}|$ is the degree of difference in the i-th software configuration parameter between nodes X and Y. For example, the degree of difference in the Operating System of nodes X and Y may be determined as "0" if their operating systems are equal in both type and version number, as "1" if they are equal in type but differ in version number, and as "2" if they differ in type. In the case of virus checkers, the degree of difference may be determined as "0" if virus checkers are used by both nodes X and Y and their version numbers are equal to each other, as "1" if their programs are equal but their version numbers are different, as "2" if their programs differ from each other, and as "3" if node X uses a virus checker but node Y does not. $s_i$ (i=1, 2, . . . , s) is a weighting variable. If the weighting variables $s_i$ are of equal value, fairness could be guaranteed for the respective software configuration parameters, and if a greater value is used for the weighting variable of a given software configuration parameter, the degree of difference of the given parameter could be emphasized. These weighting variables are determined by experiments and analysis of computer resource usage.

The degree of difference in external device configuration $D_G$ between nodes X and Y is given by:

$$D_G = g_1|D_{GX1}-D_{GY1}| + g_2|D_{GX2}-D_{GY2}| + \ldots + g_t|D_{GXt}-D_{GYt}| \quad (4)$$

where, $D_{GXi}$ (i=1, 2, . . . , t) is the i-th parameter of the external device configuration of node X, $D_{GYi}$ is the i-th parameter of the external device configuration of node Y, and $|D_{GXi}-D_{GYi}|$ is the degree of difference in the i-th external device configuration parameter between nodes X and Y. For example, the degree of difference in the hard disk parameter may be determined as "0" (i.e., there is no substantial difference) if the hard disks of nodes X and Y differ in size by less than multiple 2, as "1" if they differ by a multiple in the range between 2 and 4, and as "2" if they differ by a multiple in the range between 4 and 8. In the case of printers, the degree of difference in the printer parameter may be determined as "0" if nodes X and Y are both provided with a printer and their printers are of the same type, as "1" if they are provided with a printer but their types and specifications are different, and as "2" if node X uses a printer but node Y does not. $g_i$ (i=1, 2, . . . , t) is a weighting variable. If the weighting variables $g_i$ are of equal value, fairness could be guaranteed for the respective external device configuration parameters, and if a greater value is used for the weighting variable of a given external device configuration parameter, the degree of difference of the given parameter could be emphasized. These weighting variables are determined by experiments and analysis of computer resource usage.

The degree of difference in external device configuration $D_K$ between nodes X and Y is given by:

$$D_K = k_1|D_{KX1}-D_{KY1}| + k_2|D_{KX2}-D_{KY2}| + \ldots + k_u|D_{KXu}-D_{KYu}| \quad (5)$$

where, $D_{KXi}$ (i=1, 2, . . . , u) is the i-th parameter of the program startup configuration of node X, $D_{KYi}$ is the i-th parameter of the external device configuration of node Y, and $|D_{KXi}-D_{KYi}|$ is the degree of difference in the i-th program startup configuration parameter between nodes X and Y. For example, the degree of difference in the i-th program boot parameter may be determined as "0" if the nodes X and Y use the same program startup method and as "1" if their methods are different. $k_i$ (i=1, 2, . . . , u) is a weighting variable. If the weighting variables $k_i$ are of equal value, fairness could be guaranteed for the respective program startup configuration parameters, and if a greater value is used for the weighting variable of a given program startup configuration parameter, the degree of difference of the given parameter could be emphasized. These weighting variables are determined by experiments and analysis of computer resource usage.

In order to guarantee fault tolerance in the configuration diversity system, at least two processing nodes differ in memory size by several tens of bytes at best, the degree of difference $D_{XY}$ as given by Equation (1) must be greater than a predetermined threshold. By setting the threshold at an appropriate high value, the processing nodes 110 have a low probability of concurrently activating bugs in their application programs 111.

The configuration diversity mode system operates substantially the same as in the case of the version diversity mode system as discussed with reference to FIG. 4. However, since the differences between the diversified configurations are known in advance, the comparator 125 incorporates the known differences to verify the configuration data fetched from each processing node.

The following is a description of details of the verification step of the present invention.

Assume that a fault-tolerant parallel-run computing system has three operating processing nodes #1, #2 and #3 and that their configuration parameters are such that memories consumed by their application process are $x_1$, $x_2$, $x_3$, CPU usage rates (i.e., load average) of their application process are $y_1$, $y_2$, $y_3$, and temperatures of their CPU are $z_1$, $z_2$, $z_3$, respectively. Outlying values from each set { } of these configuration parameters are calculated using outlier detector functions "f", "g" and "h" as follows:

$$f(x_1, \{x_1, x_2, x_3\}) \quad (6)$$

$$g(y_1, \{y_1, y_2, y_3\}) \quad (7)$$

$$h(z_1, \{z_1, z_2, z_3\}) \quad (8)$$

Note that these functions are not affected by the diversified configurations.

A total outlying value H ($M_1$) of the processing node #1 is given by the following equation as a measure of the extent to which the node #1 is deviating from the other nodes:

$$H(M_1) = \alpha f(x_1, \{x_1, x_2, x_3\}) + \beta g(y_1, \{y_1, y_2, y_3\}) + \gamma h(z_1, \{z_1, z_2, z_3\}) \quad (9)$$

where, $\alpha$, $\beta$, $\gamma$ are constants.

The parameter "x" is of the type of parameter not affected by configuration, while the parameter "y" is of the type affected by configuration since the load average depends on the operating performance of the CPU. Although the parameter "z" is of the type affected by configuration since the CPU temperature depends on the architecture of the microprocessor, it may assume an undefined value if the BIOS of the processing node of this parameter cannot acquire CPU temperature. Therefore, the calculation of Equation (9) proceeds differently according to the type of parameters as follows:

(1) In the case of configuration-unaffected parameter "x", this parameter can be obtained by simply calculating Equation (9) by setting all y- and z-parameters to zero.

(2) In the case of configuration-affected parameter "y", consider a CPU's load average. If a CPU of performance 100 yields a 10%-load average for a process whose work load is 10, a CPU of performance 500 will yield a 2%-load average under the same work load. The parameter "y" is calculated by modifying Equation (7) with a function "I" which cancels the load average difference which depends on different CPU operating performances as follows:

$$\beta g(I(y_1,e_1),\{I(y_1,e_1),I(y_2,e_2),I(y_3,e_3)\}) \qquad (7')$$

where, "e" represents the configuration parameter that affects the parameter "y". The parameter "I" is represented by:

$$I(y,p)=(y \times p)/100 \qquad (10)$$

where, y is the load average of the CPU and p is the operating performance of the CPU.

(3) In the case of indeterminate configuration parameter "z" such as CPU temperature, one of the following difference-canceling functions I' is used:

$$I' = \begin{cases} A & \text{for } z = \text{indefinable} \\ F(z, e) & \text{for } z = \text{definable} \end{cases} \qquad (11)$$

where, A is a constant and F is a difference-canceling function when the parameter "z" is defined, and e is the configuration parameter that affects the parameter "z". The constant "A" is set to a small value when outlier value calculation is unreliable so that its influence is reduced. Specifically, the influence of the outlier value on the parameter "z" is rendered negligible by setting the constant γ of Equation (9) to zero.

As a result, the total outlying value of node #1 is rewritten as follows:

$$H(M_1) = \alpha f(x_1, \{x_1, x_2, x_3\}) + \qquad (12)$$
$$\beta g(I(y_1, e_1), \{I(y_1, e_1), I(y_2, e_2), I(y_3, e_3)\}) +$$
$$\gamma h(I'(z_1, e_1)\{I'(z_1, e_1), I'(z_2, e_2), I'(z_3, e_3),\})$$

Since the application programs used in the configuration diversity system are of the same software version, the development cost of the application program can be reduced. If the processing nodes of this configuration-diversity mode are virtual machines, the configuration parameters such as memory size can be easily diversified and a need does not exist to provide as many diversified computers and devices as necessary to build a desired configuration diversity environment so that the execution cost can be saved. Note that the configuration diversity concept of this invention can be applied equally as well to the second to fourth embodiments of the present invention.

Figure 12:
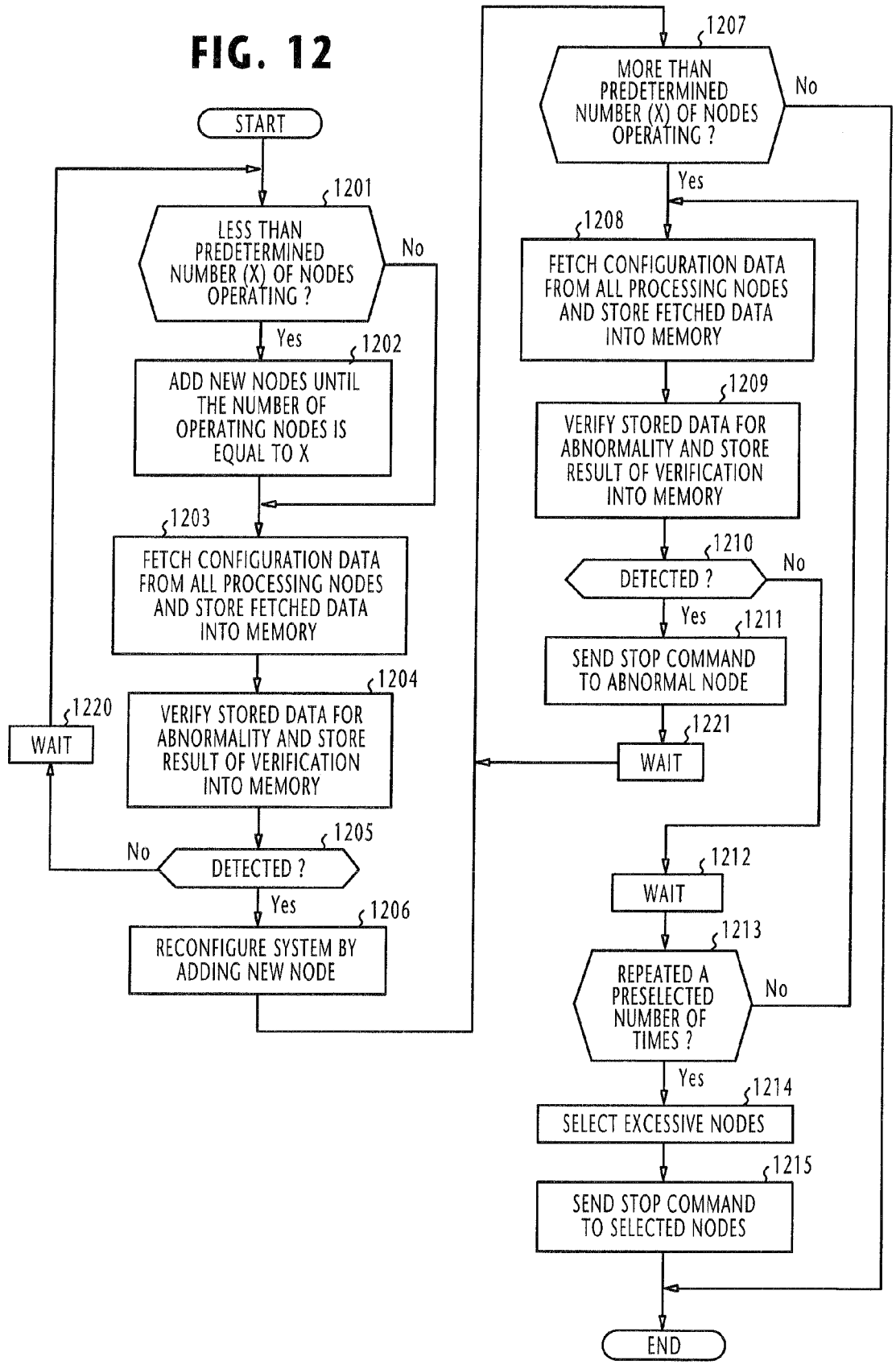
FIG. 12 is a flowchart of the operation of the management node according to the fifth embodiment of this invention.

The following is a description of the details of the verification step 1204 of FIG. 12 by using the Smirnoph-Grubbs test to identify a node having an outlying value of configuration data. According to the Smirnoph-Grubbs test, if there is a data set in which one of the members of the data set is far removed from the other members, such a data set is assumed to be an "alternative hypothesis" and the far-removed data is called an outlier. If there is a data set in which all members of the data set belong to the same population, such a data set is assumed to be an "null hypothesis" which denies the alternative hypothesis, declaring that there is no outlier. Based on these assumptions, $T_i=|X_i-X|/\sqrt{U}$ is calculated (where i represents the nodes, X is an average of data set $X_i$ and U is invariant variance), and a difference $S_i$ between $T_i$ and a point of significance "t" is determined. Data $X_i$ is verified according to the difference $S_i$.

Assume that the fetched data $(X_i)$ includes (a) the number of processes executed in each processing node, (b) the amount of memory consumed by the node and (c) the CPU's load average of the node, for example, and the following results have been obtained from nodes #1, #2 and #3:

Node #1
  a) The number of processes=14
  b) The amount of memory consumed=127,912 KB
  c) The CPU's load average=1.12%
Node #2
  a) The number of processes=17
  b) The amount of memory consumed=183,381 KB
  c) The CPU's load average=62.80%
Node #3
  a) The number of processes=15
  b) The amount of memory consumed=131,104 KB
  c) The CPU's load average=1.40%

Comparator 126 first performs the following computations to obtain an average X and invariant variance U for the configuration data item (a) in which $X_1=14$, $X_2=17$ and $X_3=15$:

$$X=\Sigma_{i=1}^n(X_i)/n=15.333$$

$$U=\Sigma_{i=1}^n(X_i-X)^2/(n-1)=1.528$$

where, n is the number of nodes from which configuration data are fetched.

The differences $S_i$ (i=1, 2, 3) between the number of processes $X_i$ of node "i" and the average value X are:

$$S_1=|X_1-X|=1.333$$

$$S_2=|X_2-X|=1.667$$

$$S_3=|X_3-X|=0.333$$

It is seen that the data that differs most from the average is data $X_2$. Applying the Smirnoph-Grubbs test to data $X_2$ to determine if $X_2$ is an outlier, the following result is obtained:

$$T_2=|X_2-X|/\sqrt{U}=1.091$$

By applying a test of statistical hypothesis to the obtained value with a level of significance equal to 5%, the point of significance (t) equals 1.153 (from the Table of Statistical Data). Since $T_2<t$, the null hypothesis is adopted. Therefore, $X_2$ is not an outlier. Hence, no outliers exist.

In like manner, the comparator performs the following computations to obtain an average (X) and the invariant variance (U) for the amount of memory consumed in which $X_1=127,912$, $X_2=183,381$, $X_3=131,104$:

X=147,465.700
  U=31,144.510
  $S_1$=19,553.700
  $S_2$=35,915.300
  $S_3$=16,361.700

Since the data that differs most from the average is data $X_2$, the Smirnoph-Grubbs test is applied to data $X_2$ to determine if it is an outlier. The result of the test indicates that $T_2=1.153$. Since $T_2 \geq t$, the null hypothesis is rejected. Hence the consumed memory $(X_2)$ is an outlier.

Next, the comparator 126 performs the following computations to obtain an average (X) and the invariant variance (U) for the CPU's load average ($X_1=1.12$, $X_2=62.80$, $X_3=1.40$):

Hence,
  X=21.773

U=35.530
S₁=20.653
S₂=41.027
S₃=20.373

Since the data that differs most from the average is data $X_2$, the Smirnoph-Grubbs test is applied to data $X_2$ to determine if it is an outlier. The result of the test indicates that $T_2=1.155$. Since $T_2 \geq t$, the null hypothesis is rejected. Hence the CPU's load average ($X_2$) is an outlier.

The total outlying value H can also be used for the verification purpose by rewriting Equation (9) as follows by assuming that constants $\alpha$, $\beta$, $\gamma$ are equal to 1:

$$H_i = f(X_i, \{X_1, \ldots, X_n\}) + g(Y_i, \{Y_1, \ldots, Y_n\}) + h(Z_i, \{Z_1, \ldots, Z_n\})$$

If $X_i$ is an outlier in the data set $[(X_1, \ldots, X_n]$, the function $f(X_i, \{X_1, \ldots, X_n\})$ is equal to 1, otherwise, 0. In this example, $X_i$, $Y_i$ and $Z_i$ are given as follows:

$X_i$=the number of processes performed by node "i"
$Y_i$=the amount of memory consumed by node "i"
$Z_i$=the CPU's load average of node "i"

Therefore, the total outlying values $H_i$ of the nodes #1, #2, #3 are:

$$H_1 = 0+0+0 = 0$$

$$H_2 = 0+1+1 = 2$$

$$H_3 = 0+0+0 = 0$$

If the total outlying value H for diagnosing that a node is abnormal is equal to 2, the node #2 is identified as being abnormal.

From the foregoing description, it can be seen that the mutual verification of configuration status data enables the management node 120 to detect an early symptom of the potential cause of trouble which could lead to an abnormal node well before all the processing nodes produce their results of executions. Preferably, each of the processing nodes is diversified in at least one of the two factors, i.e., the software version of the common application program and the node configuration described above. Another factor that can be advantageously diversified for the purpose of this invention includes variability of the physical equipment among the processing nodes due to different manufacturing processes (or tolerances) and different aging characteristics.

Figure 5:
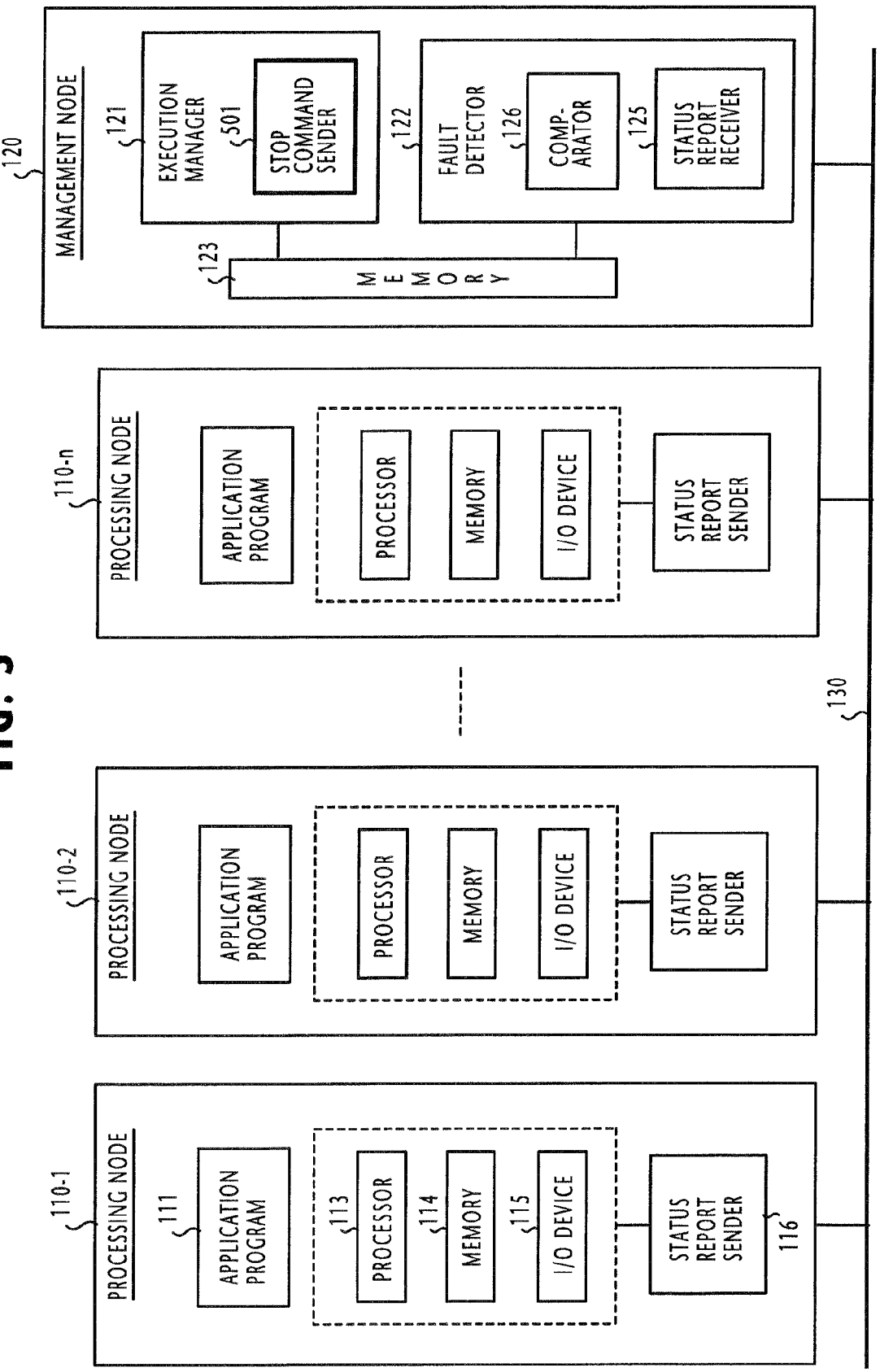
FIG. 5 is a block diagram of a computing system according to a second embodiment of the present invention.

FIG. 5 shows a second embodiment of the present invention which differs from the previous embodiment in that the execution manager 121 includes a stop command sender 501, instead of or in addition to the message sender 124 of FIG. 1.

Figure 6:
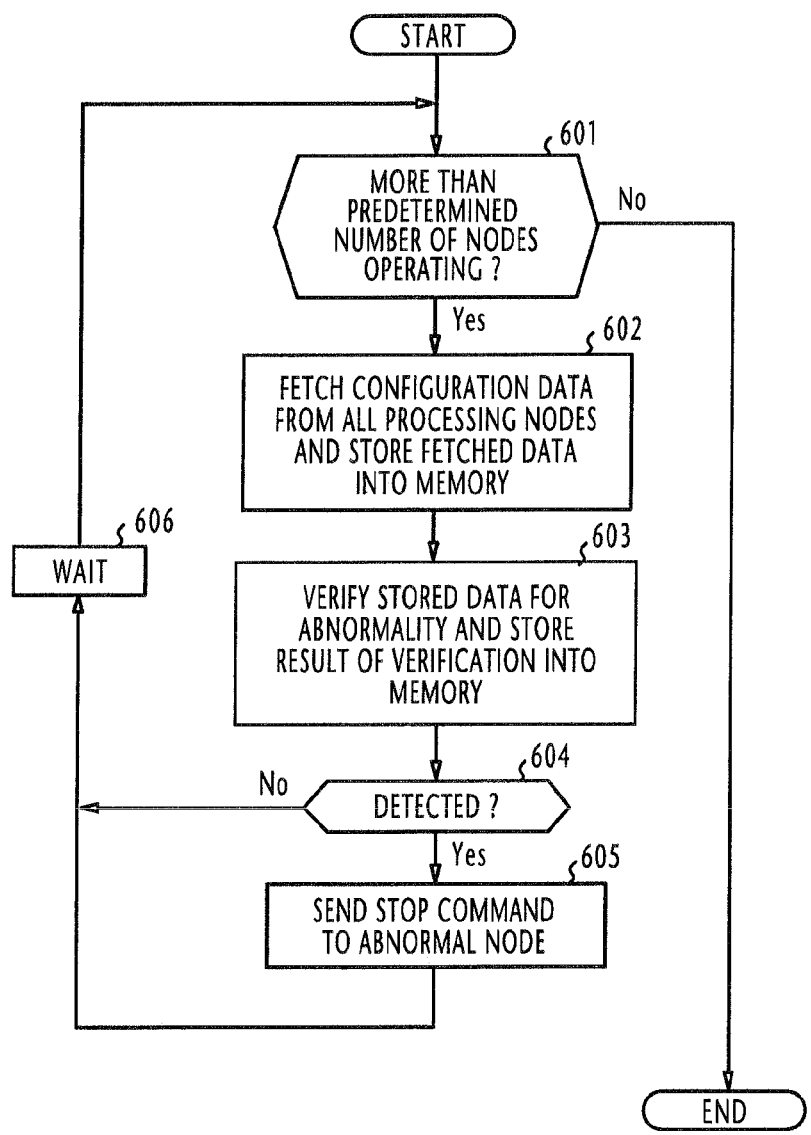
FIG. 6 is a flowchart of the operation of the management node according to the second embodiment of this invention.

According to the second embodiment of the present invention, the execution manager 121 of FIG. 5 repeatedly executes the routine of FIG. 6 at periodic intervals. In each routine, the execution manager 121 starts with decision step 601 to determine if more than a predetermined number of processing nodes are operating. If not, flow proceeds to the end of the routine. If the decision is affirmative at step 601, flow proceeds to step 602 to fetch configuration items from all operating processing nodes and stores the fetched data in the memory 123. At step 603, the comparator 123 reads the stored configuration status data from the memory 123 and verifies the status data by comparisons between each node and every other node in the same manner as described above. If the comparator 125 detects a node whose configuration status data significantly differs from those of every other node, it identifies the node as an abnormal node and stores this identity in the memory 123. If an abnormal node is detected (step 604), the stop command sender 501 transmits a stop command via the communication medium 130 to a processing node that is identified by the stored identity so that the abnormal node ceases to operate (step 605). Flow returns from step 605 to step 601 after waiting a predetermined interval (step 606) and repeats steps 602 and 603. Flow also returns to step 601 via waiting step 606 when no abnormal node is detected at step 604. If the abnormal node is a physical machine, its power supply is shut down. If the abnormal node is a virtual machine, the process that creates the virtual machine is deactivated.

By stopping the operation of an abnormally operating node as described above, the consumption of failed system resource can be avoided and the execution cost can be lowered. In comparison with the prior art in which failure detection is started only after the configuration data of all nodes are available, the effect of execution cost reduction is significant. Further, the normally operating nodes are prevented from possible propagation of troubles which would otherwise occur as a result of the continued operation of the abnormal node.

Figure 7:
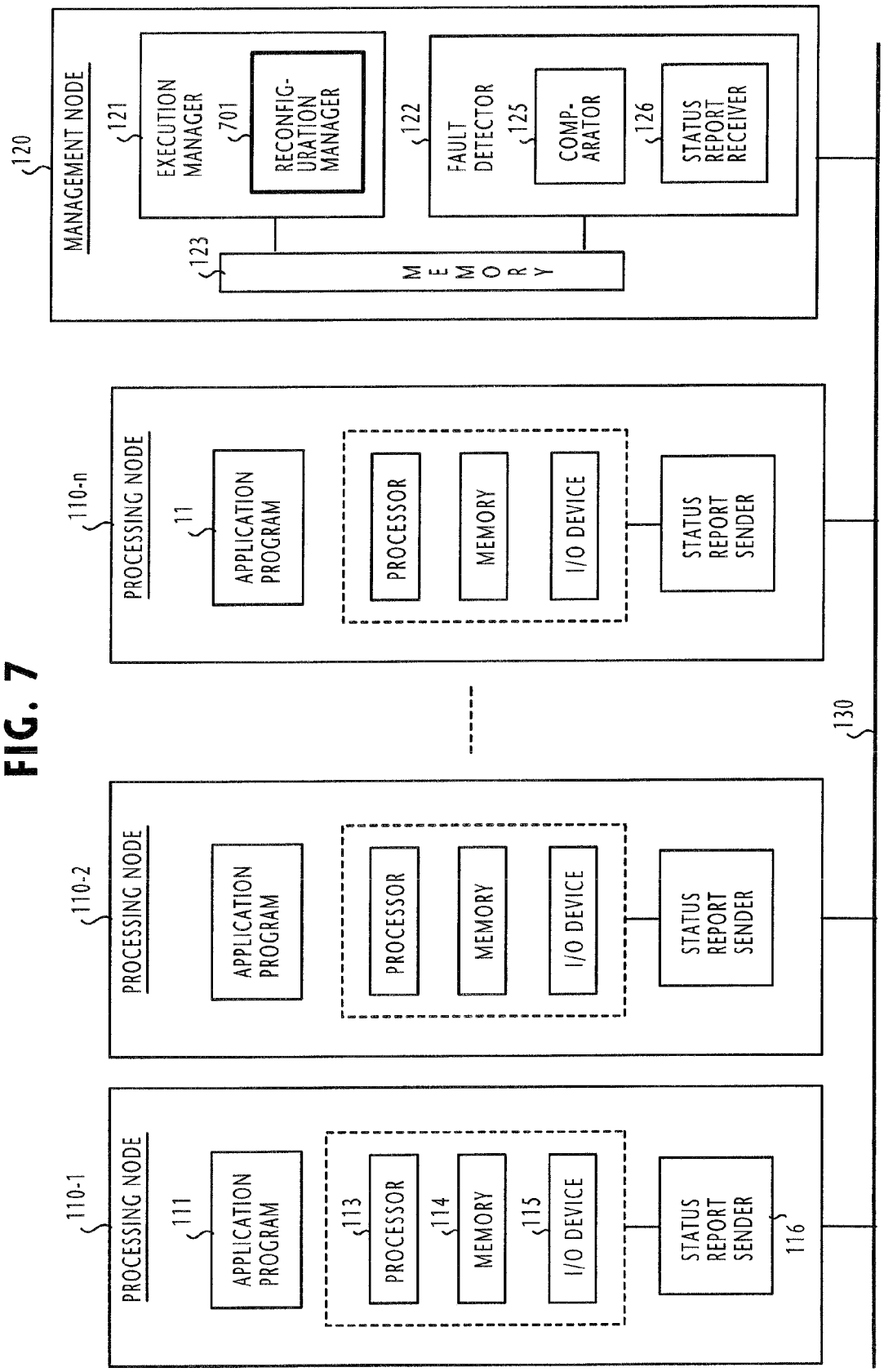
FIG. 7 is a block diagram of a computing system according to a third embodiment of the present invention.

FIG. 7 shows a third embodiment of the present invention which differs from the previous embodiment in that the execution manager 121 includes a reconfiguration manager 701. In this embodiment, the memory 123 stores information indicating the number of processing nodes that can be incorporated into the system for parallel run operation, the configuration data of such processing nodes, and the number of currently operating processing nodes.

Figure 8:
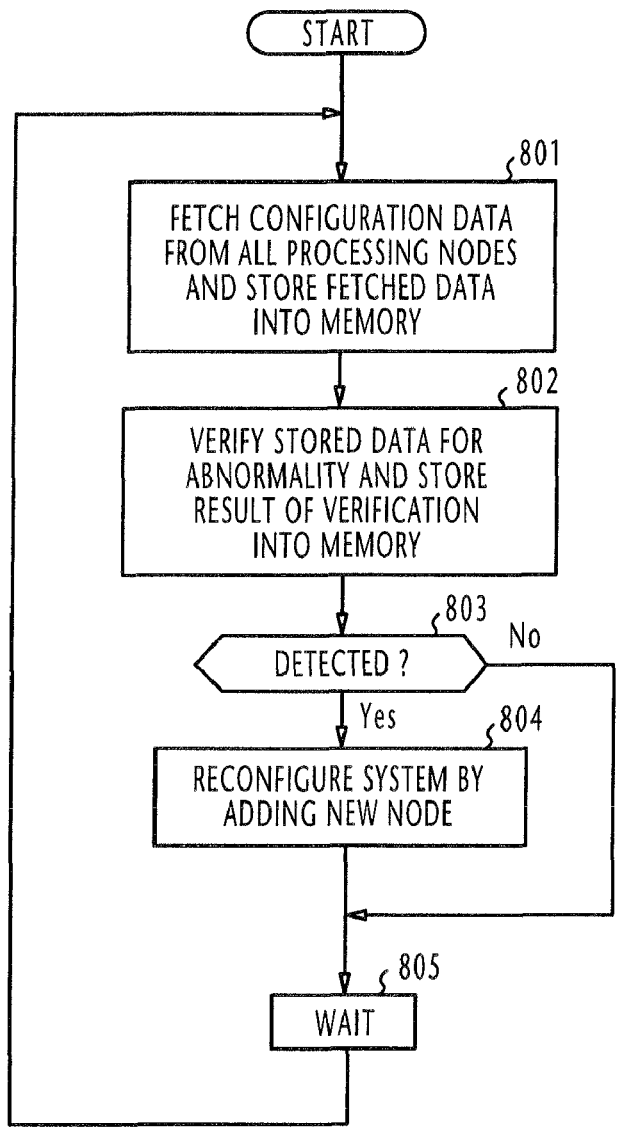
FIG. 8 is a flowchart of the operation of the management node according to the third embodiment of this invention.

According to the third embodiment of the present invention, the execution manager 121 of FIG. 7 repeatedly executes the routine of FIG. 8 at periodic intervals. In each routine of FIG. 8, the execution manager 121 of FIG. 7 begins with step 801 to fetch configuration items from all operating processing nodes and stores the fetched data in the memory 123. At step 802, the comparator 125 reads the stored configuration status data from the memory 123 and compares the status data item-by-item between each node and every other node. If the comparator 125 detects a node whose configuration status data significantly differs from those of every other node, it identifies the node as an abnormal node and stores this identity in the memory 123. If an abnormal node is detected (step 803), the reconfiguration manager 701 reconfigures the system by selecting a new processing node from the memory 123, and sending a power-on command to the selected node through the communication medium 130 so that it joins with other processing nodes (step 804). The new processing node has a different version of the application program 111 from every other node of the system. Following the negative decision of step 803 or the execution of step 804, flow returns to step 801 after waiting a predetermined interval of time at step 805.

By adding at least one new processing node in the event of a node failure, it is ensured that a parallel-run computing system is always operating with a sufficient number of processing nodes to guarantee its fault tolerance.

Figure 9:
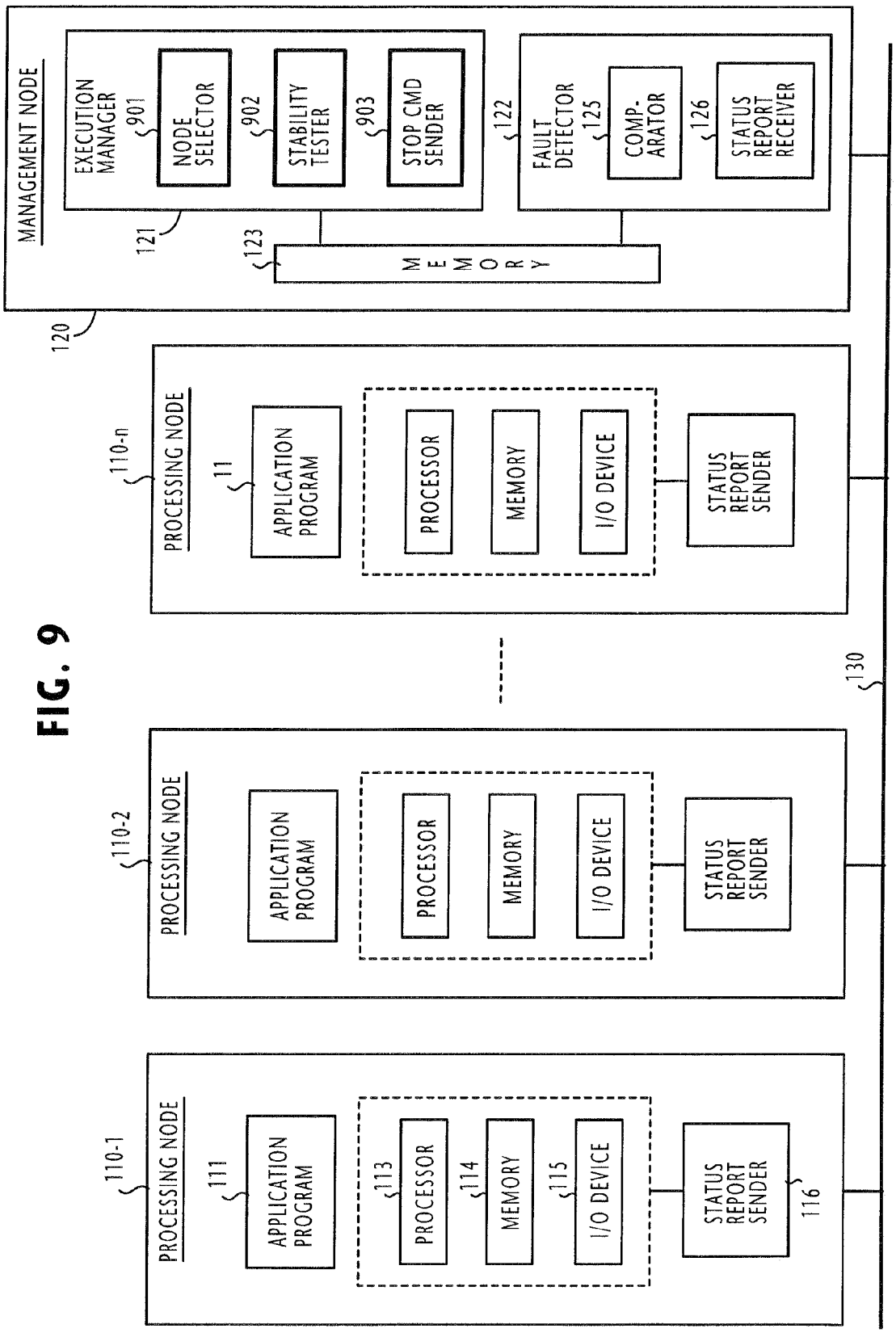
FIG. 9 is a block diagram of a computing system according to a fourth embodiment of the present invention.

A fourth embodiment of the present invention is shown in FIG. 9, which differs from the previous embodiment in that the execution manager 121 includes a node selector 901, a stability tester 902 and a stop command sender 903, In this embodiment, if more than a predetermined number (X) of processing nodes are operating without node failure for a predetermined period of time, it is determined that the system is in a stabilized state and a number of nodes are stopped to operate the system with the predetermined number of nodes.

Figure 10:
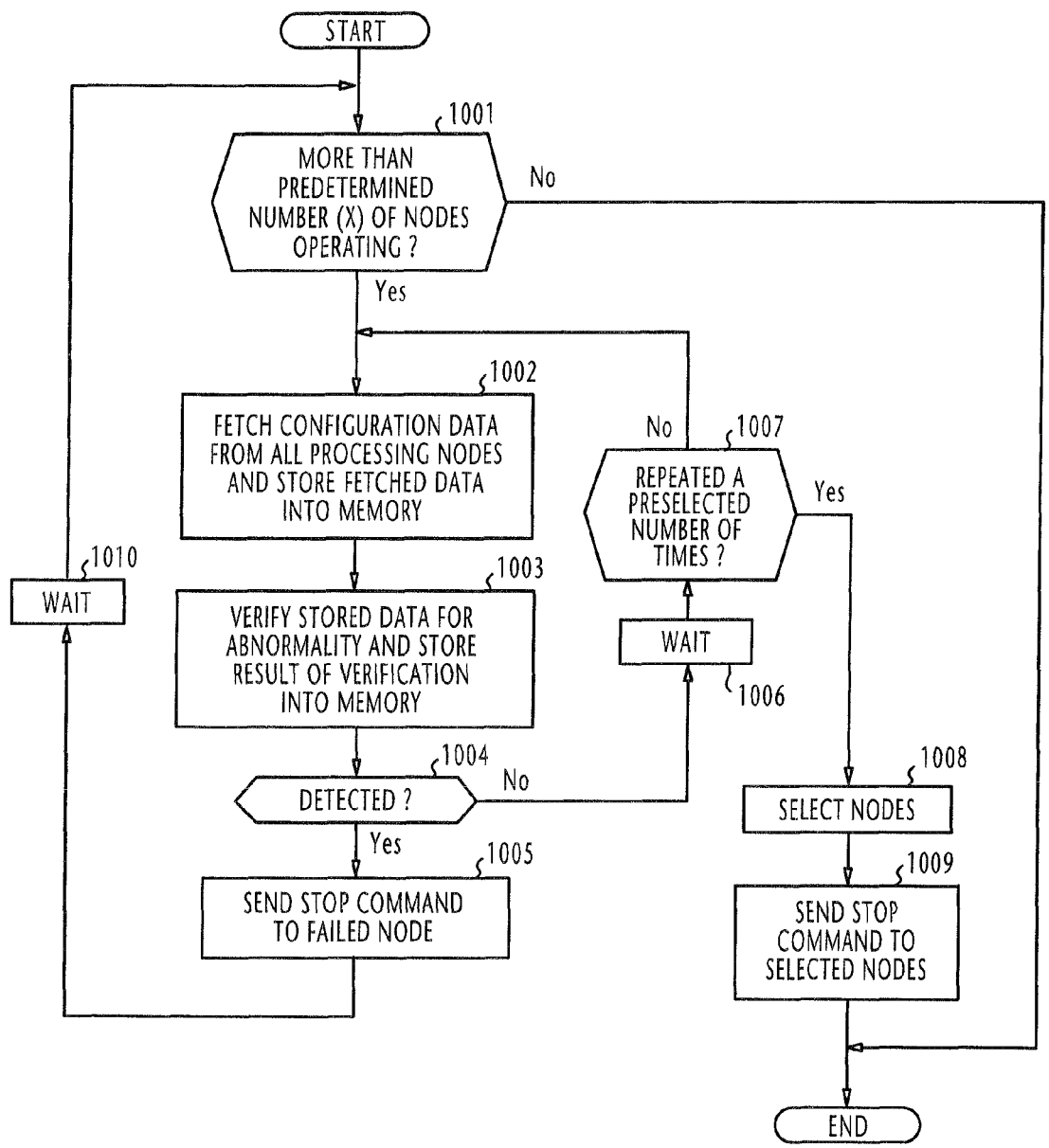
FIG. 10 is a flowchart of the operation of the management node according to the fourth embodiment of this invention.

According to the fourth embodiment of the present invention, the execution manager 121 of FIG. 9 repeatedly executes the routine of FIG. 10 at periodic intervals. In each routine of FIG. 10, the execution manager 121 of FIG. 9 begins with step 1001 to determine whether the system is operating with more than a predetermined number (X) of processing nodes. If not, the routine is terminated. If the decision is affirmative, the execution manager 121 fetches configuration items from all operating processing nodes and stores the fetched data in the memory 123 (step 1002). At step 1003, the comparator 125 reads the stored configuration status data from the memory 123 and compares the status data item-by-item between each node and every other node. If the comparator 125 detects a node whose configuration status data significantly differs from those of every other node, it identifies the node as an abnormal node and stores this identity in the memory 123. If an abnormal node is detected (step 1004), the stop command sender 903 transmits a stop command to the abnormal node (step 1005), and flow returns to the starting point of the routine after waiting a predetermined amount of time (step 1010).

If no abnormal node is detected, flow proceeds from step 1004 to step 1006 to perform a stability test. The stability test is run by the stability tester 902 by waiting a predetermined timeout period following the negative decision of step 1004. When the timeout period expires, flow proceeds to step 1007 to check to see if the verification is repeated a preselected number of times. If not, steps 1002 and 1003 are repeated if the data fetch and verification process is repeated a number of times equal to that preselected number, it is determined that the system is in a stabilized state, and the stability tester 902 instructs the node selector 901 to select one or more operating nodes which are in excess of the predetermined number "X" (step 1008). In this node selecting process, the node selector 901 may randomly select an excessive number of nodes for load balancing purpose, or select nodes according to a descending order of ranks to which all processing nodes are pre-assigned, or according to a round-robin schedule. The identities of the selected nodes are stored in the memory 123. At step 1009, the stop command sender 903 is activated to read the stored node identities and send a stop command to the selected processing nodes over the communication medium 130.

Since the selected processing nodes are provided in number greater than is required to guarantee fault tolerance, the stopping of these nodes saves the execution cost of the system.

Figure 11:
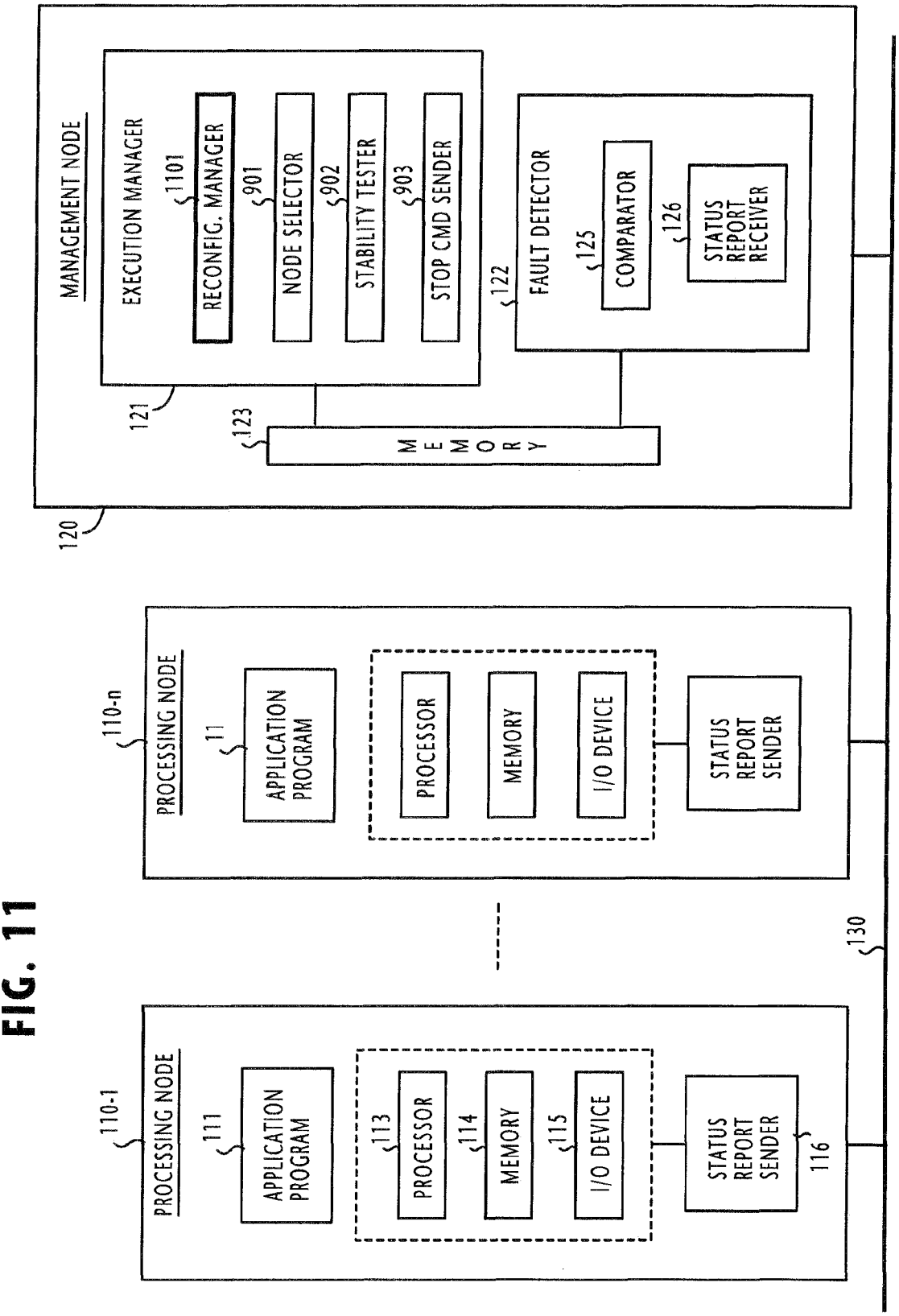
FIG. 11 is a block diagram of a computing system according to a fifth embodiment of the present invention.

A fifth embodiment of the present invention is shown in FIG. 11, which differs from the fourth embodiment by the inclusion of a reconfiguration manager 1101 in that the execution manager 121 in addition to the node selector 901, stability tester 902 and stop command sender 903. In this embodiment, if less than a predetermined number (X) of processing nodes are operated, the reconfiguration manager 1101 is activated for adding new processing nodes to the system to guarantee fault tolerance. If one of the nodes of the reconfigured system fails, new nodes are added to maintain fault tolerance. If the number of operating processors becomes more than the predetermined number "X", the stability tester 902 is activated to run a stability test over the reconfigured system. If the test reveals that a faulty node exists, the stop command sender 903 is activated for stopping the abnormal node. If it is determined that the system is in a stabilized state, the node selector 901 is activated to select excessive nodes and a stop command is sent from the stop command sender 903 to the selected nodes.

According to the fifth embodiment of the present invention, the execution manager 121 of FIG. 11 repeatedly executes the routine of FIG. 12 at periodic intervals. In each routine of FIG. 12, the execution manager 121 of FIG. 11 begins with decision step 1201 to determine whether the system is operating with less than a predetermined number (X) of processing nodes. If the decision is affirmative, the execution manager 121 proceeds to step 1202 to activate the reconfiguration manager 1101 to reconfigure the system by adding new processing nodes until the number of operating nodes is equal to the predetermined number "X". Flow proceeds to step 1203 to fetch configuration data items from all operating processing nodes by logging in each of the processing nodes via telnet, sending a command for each configuration item, receiving a response and storing the fetched data in the memory 123. If the decision at step 1201 is negative, step 1203 is executed, skip step 1202.

At step 1204, the comparator 125 reads the stored configuration status data from the memory 123 and compares the status data item-by-item between each node and every other node. If the comparator 125 detects a node whose configuration status data significantly differs from those of every other node, it identifies the node as an abnormal node and stores this identity in the memory 123. If no abnormal node is detected (step 1205), flow returns to the starting point of the routine after waiting a predetermined amount of time (step 1220). Details of verification step 1204 will be described later.

If an abnormal node is detected at step 1205, the reconfiguration manager 1101 is activated at step 1206 to reconfigure the system by adding new processing nodes to take over the function of the abnormal node, and flow proceeds to decision step 1207.

At decision step 1207, the execution manager 121 check to see if more than the predetermined number "X" of processing nodes are operating. If not, the routine is terminated. Otherwise, flow proceeds to step 1208 to fetch configuration data from all operating processing nodes and stores the fetched data in the memory 123 and the comparator 125 reads the stored configuration status data from the memory 123 and compares the status data item-by-item between each node and every other node (step 1209). If the comparator 125 detects an abnormal node (step 1210), its identity is stored in the memory 123 and the stop command sender 903 is activated at step 1211 to transmit a stop command to the abnormal node, and flow returns to step 1207 after waiting a predetermined period of time (step 1221). If the number of operating nodes is still greater than "X", the routine is terminated. Otherwise, steps 1208 to 1211 are repeated.

If no abnormal node is detected at step 1210, flow proceeds to step 1212 to activate the stability tester 902 which performs a stability test by first waiting a predetermined timeout period. When the timeout period runs out, flow proceeds to step 1213 to check to see if the verification step 1209 is repeated a preselected number of times. If not, flow returns to step 1208 to perform verification again on configuration status data fetched after the timeout period of step 1212 has lapsed. If the data fetch and verification process is repeated a number of times equal to that preselected number, it is determined that the system is in a stabilized state, and flow proceeds from step 1213 to step 1214 in which the stability tester 902 instructs the node selector 901 to select one or more operating nodes which are in excess of the predetermined number "X" and the identities of such nodes are stored in the memory 123. At step 1215, the stop command sender 903 is activated to read the stored node identities and send a stop command to the selected processing nodes over the communication medium 130.

Figure 13:
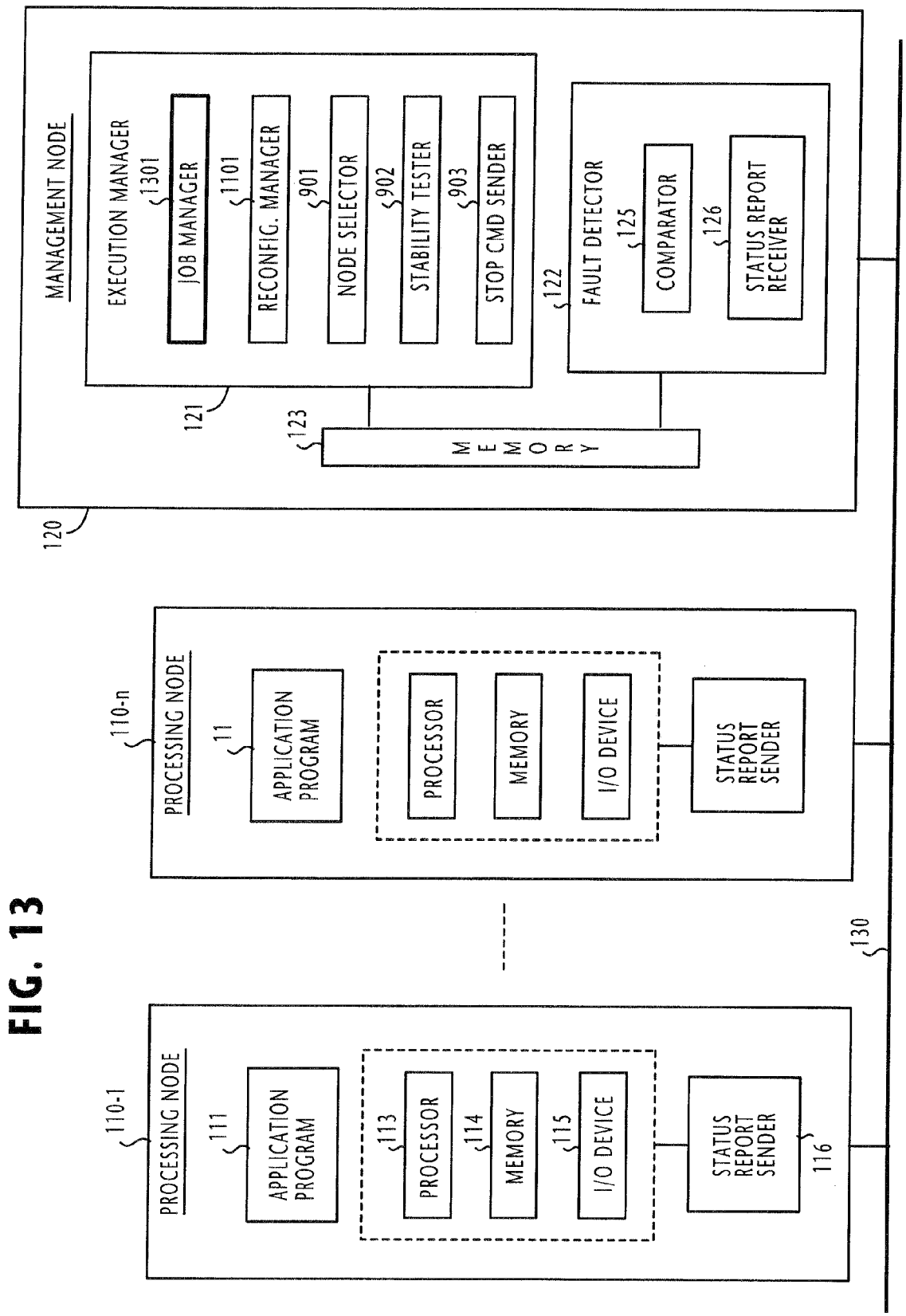
FIG. 13 is a block diagram of a computing system according to a sixth embodiment of the present invention.
Figure 14:
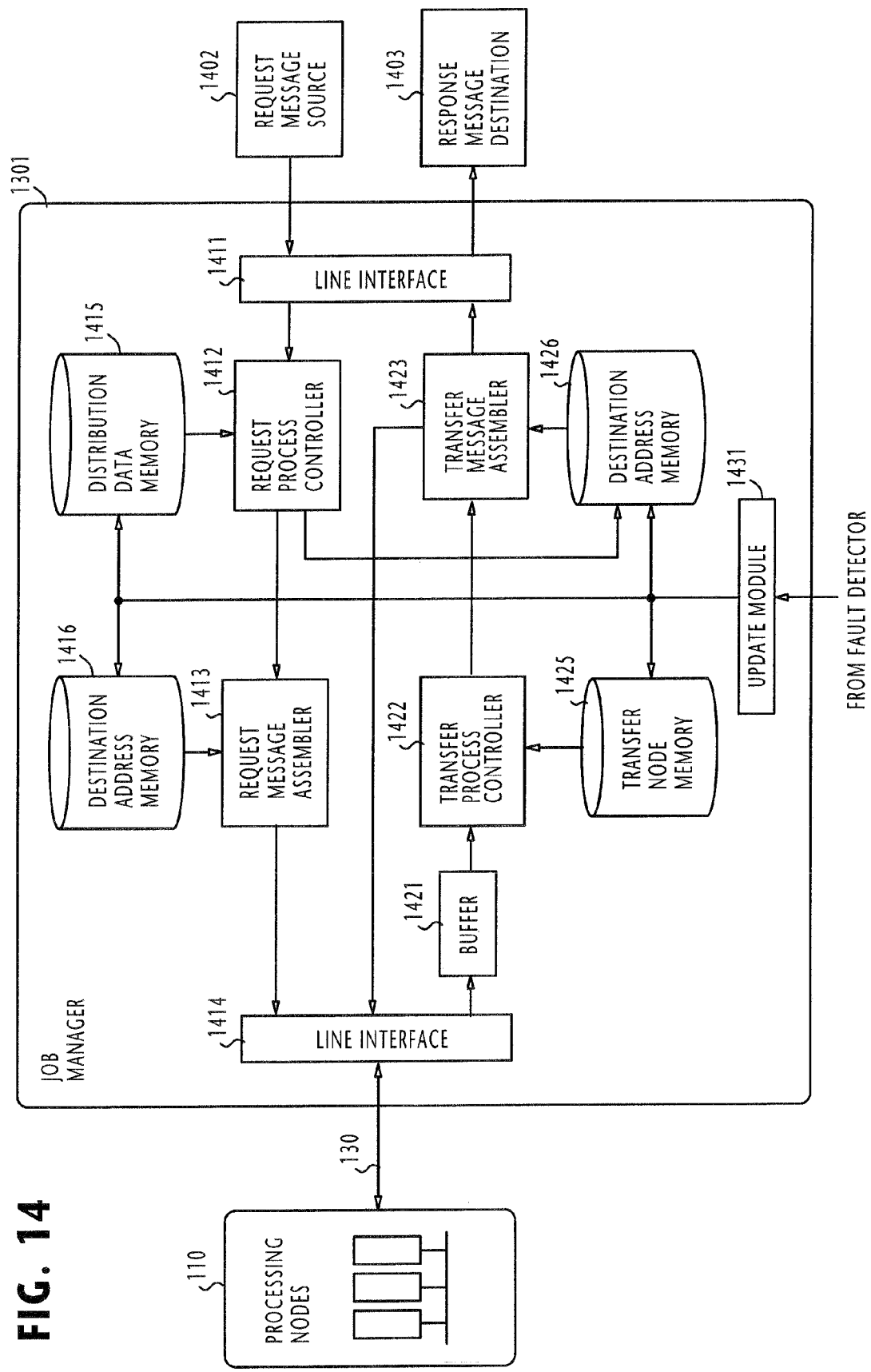
FIG. 14 is a block diagram of the job manager of FIG. 13.

A sixth embodiment of the present invention is shown in FIG. 13 which differs from the embodiments of FIG. 11 in that the execution manager 121 further includes a job manager 1301 in addition to the reconfiguration manager 1101, node selector 901, stability tester 902 and stop command sender 903. Details of the job manager 1301 are illustrated in FIG. 14.

Job manager 1301 comprises a distribution data memory 1415 for storing load balancing (distribution criteria) information for distributing request messages among the processing nodes depending on their different request sources (for example, the stored information is the address of a particular machine or a lightly loaded machine for a particular request source and an indication that request messages from a particular source be rejected), a first decision means or request process controller 1412, a line interface 1411, a destination address memory 1416 for storing address data of destination processing nodes, a request message assembler 1413, a transfer node memory 1425, a second decision means or transfer process controller 1422, a line interface 1414, a destination address memory 1426 for storing destinations of transfer messages, an outbound transfer message assembler 1413, and a buffer 1421 for storing the received transfer messages.

Distribution data memory 1415 and the destination address memory 1416 are connected to the update module 1431 connected to the fault detector 122. Message distribution criteria is stored and identifiers of message destination processing nodes. The contents of both memories 1415 and 1416 are updated by an update module 1431 according to the operating status of the system. Transfer node memory 1425 is connected to the fault detector 122 to store the types of processing nodes and the number of available processing nodes for processing external request messages arriving from an external source or database. The contents of the transfer node memory 1425 are updated according to the operating status of the system by the update module 31. Destination address memory 1426 is also connected to the update module 31 to store the addresses of processing nodes currently available.

The operation of the job manager 1301 proceeds as follows.

When the request process controller 1412 receives a request message from a message source 1402 via the line interface 1411, it looks up the distribution data memory 1415 and makes a decision as to whether or not the request message can be transferred to a processing node. If not, the request process controller 1412 returns a reject message to the message source 1402. If the message can be transferred to a processing node, the request process controller 1412 stores the address of the message source 1402 in the destination address memory 1426 and supplies the received request message to the request message assembler 1413. Request message assembler 1413 assembles multiple request messages with addresses data supplied from the destination address memory 35 so that they are destined to respective processing nodes. The request messages assembled by the request message assembler 1413 are forwarded onto the communication medium 130 from the line interface 1411 and transmitted to the destination processing nodes.

On receiving the request message, each destination processing node instructs its application program 111 to process the received message and transmits a response message to the communication medium 130. If a given response message is not the final result of the job processing, this message will be destined to and processed by another processing node which may be part of the same computing system or part of other computing system. For each request message, final response messages destined to the management node 120 are produced in parallel from the processing nodes and transmitted to the communication channel.

Line interface 1414 thus receives the final response messages from the processing nodes 1. In addition to the final response messages, the line interface 1414 receives "external request messages" which arrive from an external system via the communication channel. Therefore, a number of such "transfer" messages sequentially occur on the communication channel. In order to treat the arriving messages differently depending on their type, they are stored in the buffer 1421. Transfer process controller 1422 checks the buffer 1421 to see if there is at least one response message. If no message is stored in the buffer 1421, the transfer process controller 1422 terminates the routine. Otherwise, the transfer process controller 1422 reads a stored message out of the buffer 1421 and looks up the transfer node memory 1425.

If an external request message is stored in the buffer, the controller 1422 looks up the transfer node memory 1425 and determines if there is at least one processing node currently available for processing this message. If this is the case, the transfer process controller 1422 determines that the external request message can be transferred and the outbound transfer message assembler 1423 formulates an outbound request message with the address of the destination processing node specified in the destination address memory 1426. This message is supplied to the line interface 1411 and transmitted through the communication channel to the specified processing node. If the decision at step 143 is negative, the external request message is discarded.

If there is only one final response message in the buffer, the outbound transfer message assembler 1423 formulates an outbound response message with the address of the request source 1402 which is stored in the destination address memory 1426 (step 144). The final response message is then supplied to the line interface 1414 and transmitted to the destination 1403 of the response message.

If a number of final response messages are stored in the buffer 1421, the operation of transfer process controller 1422 includes one of the following processes (a) selecting a first-arrival of the final response messages, (b) making a majority decision on the messages arriving in a specified time interval (one minute, for example) and selecting one of the majority-decided messages, (c) making a majority decision on a predetermined number of response messages and selecting one of the majority-decided messages, and (d) calculating an average value of final response messages which arrive in a specified time interval and formulating a response message with the average value.

Figure 15:
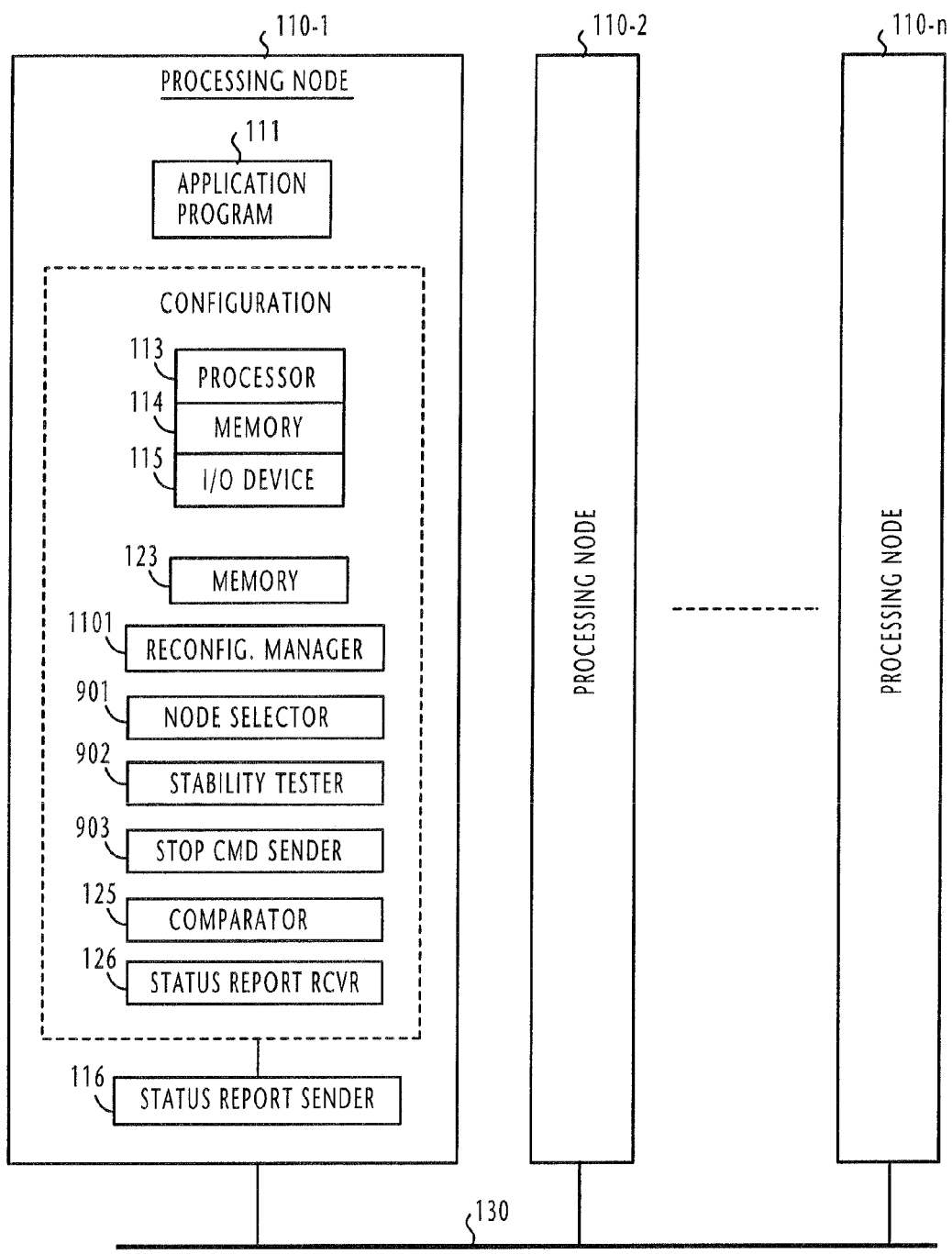
FIG. 15 is a block diagram of a computing system according to a seventh embodiment of the present invention in which processing nodes are each provided with a distributed management function.

FIG. 15 is a block diagram of a seventh embodiment of the present invention in which the computing system comprises a plurality of processing nodes 110-1~110-n each having a distributed management function identical to those embodiments shown and described with reference to FIG. 11, in addition to processing function for processing application programs. The management function of each processing node cooperates with the management function of every other processing node over the communication medium 130 to exchange configuration and command data. When the management function of a processing node detects an abnormal node in the system, this processing node is given an exclusive right to issue a command message to the failed node to reconfigure the system. This is done by a negotiation method or a node selection method as follows:

If the negotiation method is used in a system comprising processing nodes A, B and C where the node A issues a command and the node B is the target node to receive that command, the node A initially sends a request message to the third node C for requesting a permission to control the target node B. If the node C itself is accessing the node B, the node C returns a reject message to the node A. If no reject message is returned within a predetermined period, the node A is granted the right to control the node B. Otherwise, the node A waits a random interval to retransmit the request message to the node C. If the reject message is repeatedly received a predetermined number of times, the node A abandons the request. If the node selection method is used, one of the processing nodes is accorded the right to perform the management function of the system. If the selected node is shutdown for some reason, another processing node is selected to operate as a management node. If the management function of one of the processing nodes fails, another node takes over the function of the failed node. In this way, the fault tolerance performance of a multi-node parallel-running computing system is enhanced.

What is claimed is:

1. A fault tolerant computing system comprising:
a plurality of processing nodes interconnected by a communication medium, wherein said processing nodes are configured either in a substantially equal configurations for parallel-running a plurality of uniquely different versions of identical application programs or in a plurality of uniquely different configurations for parallel-running a plurality of substantially equal versions of identical application programs; and
a fault detector connected to said processing nodes via said communication medium for periodically collecting configuration status data from said processing nodes and mutually verifying the configuration status data of said processing nodes with each other for detecting an abnormal node whose operating state is beyond a range of normal deviations of the uniquely different configuration of the node, wherein said fault detector comprises means for detecting configuration status data whose value differs significantly from a data set, based on a statistical test, and formed by the configuration status data of all of said processing nodes and identifying one of said processing nodes which provides the detected configuration status data, and
wherein the configuration status data includes, at least, information regarding the processing node's operating state and memory usage.

2. The fault tolerant computing system of claim 1, wherein the configurations of said processing nodes are sufficiently different from each other so that a software fault is not simultaneously activated by said processing nodes.

3. The fault tolerant computing system of claim 1, further comprising means for transmitting a report message to an external destination if an abnormal node is detected by said fault detector.

4. The fault tolerant computing system of claim 1, further comprising means for transmitting a stop command message to one of said plurality of processing nodes if said one processing node is detected by said fault detector as an abnormal node.

5. The fault tolerant computing system of claim 1, further comprising means for connecting a new processing node to said communication medium if an abnormal node is detected by said fault detector.

6. The fault tolerant computing system of claim 1, further comprising means for causing said fault detector to periodically collect and verify configuration status data from said processing nodes a predetermined number of times for detecting stability of said processing nodes if the number of said processing nodes is more than a predetermined number, selecting at least one processing node, and transmitting a stop command message to the selected at least one processing node.

7. The fault tolerant computing system of claim 6, further comprising means for transmitting a stop command message to one of said processing nodes if said one processing node is detected by said fault detector as an abnormal node while said configuration status data is periodically collected and verified for detecting said stability.

8. The fault tolerant computing system of claim 1, further comprising a management node connected to said communication medium for respectively setting said processing nodes in a substantially unified configuration for parallel-running said plurality of uniquely different versions of identical application programs.

9. The fault tolerant computing system of claim 1, further comprising a management node connected to said communication medium for respectively setting said processing nodes in said uniquely different configurations for parallel-running said plurality of substantially equal versions of identical application programs.

10. The fault tolerant computing system of claim 1, wherein said fault detector is provided in each of said processing nodes, the fault detector of each of said processing nodes cooperating with the fault detector of every other node for identifying an abnormal node.

11. The fault tolerant computing system of claim 1, wherein each of said uniquely different configurations comprises hardware configuration, software configuration, external device configuration and program startup configuration.

12. The fault tolerant computing system of claim 11, wherein said hardware configuration is represented by status data which includes parameters indicating main memory size, virtual memory size, memory access timing, processor operating speed, bus transmission speed, bus width, number of processors, read cache memory size, write cache memory size, cache's valid/invalid status, and types of processors and memories, and wherein each of said processing nodes differs from every other processing node in one of said parameters of hardware configuration status data.

13. The fault tolerant computing system of claim 11, wherein said software configuration is represented by status data which includes parameters indicating operating system, basic software, various device drivers, and various library versions, and wherein each of said processing nodes differs from every other processing node in one of said parameters of software configuration status data.

14. The fault tolerant computing system of claim 11, wherein said external device configuration is represented by status data which includes parameters indicating types of external devices, display unit, input/output device, and communication interface, and wherein each of said processing nodes differs from every other processing node in one of said parameters of external device configuration status data.

15. The fault tolerant computing system of claim 11, wherein said program startup configuration is represented by status data which includes parameters indicating (a) interruption and reboot of an application program by suspending the CPU while holding contents of main memory, (b) interruption and reboot of an application program by saving contents of the main and virtual memories on a hard disk, suspending operating system and restoring the saved memory contents when operating system is restarted, (c) interruption and reboot of an application program by suspending and restarting operating system, (d) interruption and reboot of an application program by forcibly interrupting and restarting the program and operating system, (e) restarting of an application program and operating system after reinstalling the program and operating system, and (f) restarting an application program and operating system after performing a clear install of the program and operating system, and wherein each of said processing nodes differs from every other processing node in one of said parameters of program startup configuration data.

16. The fault tolerant computing system of claim 1, wherein each of said processing nodes is a real machine.

17. The fault tolerant computing system of claim 1, wherein each of said processing nodes is a virtual machine.

18. The fault tolerant computing system comprising:
a plurality of processing nodes interconnected by a communication medium, wherein said processing nodes are configured either in a substantially equal configurations for parallel-running a plurality of uniquely different versions of identical application programs or in a plurality of uniquely different configurations for parallel-running a plurality of substantially equal versions of identical application programs; and
a fault detector connected to said processing nodes via said communication medium for periodically collecting configuration status data from said processing nodes and mutually verifying the configuration status data of said processing nodes with each other for detecting an abnormal node whose operating state is beyond a range of normal deviations of the uniquely different configuration of the node,
a management node including a memory for storing distribution data, means for distributing request messages respectively to said processing nodes according to the stored distribution data, means for receiving response messages as said configuration status data from said processing nodes,
wherein said fault detector is provided in said management node for verifying the received response messages with each other for detecting an abnormal node, and updating the stored distribution data if an abnormal node is detected,
wherein said management node further comprises decision means for making a determination as to whether said request messages are destined for said plurality of processing nodes or destined for an external processing node, and means for transmitting the request messages to said processing nodes or said external processing node depending on said determination,
wherein said decision means calculates an average value from said plurality of response messages and formulates a final response message with said average value, and
wherein the configuration status data includes, at least, information regarding the processing node's operating state and memory usage.

19. The fault tolerant computing system of claim 18, wherein said decision means selects one of said response messages as a system output.

20. The fault tolerant computing system of claim 18, wherein said decision means makes a majority decision on said response messages which arrive in a specified time interval and selects one of the majority-decided response messages as a system output.

21. The fault tolerant computing system of claim 18, wherein said decision means receives an external request message from an external source via said communication medium and sends the received message to one of said processing nodes.

22. A management node for a computing system which comprises a plurality of processing nodes interconnected by a communication medium, wherein said processing nodes are arranged to either operate in a hardware diversity mode in which said nodes are set in a plurality of uniquely different configurations, or operate in a software diversity mode in which said nodes are set to parallel-run a plurality of uniquely different versions of identical application programs, comprising:
means for periodically collecting configuration status data from said processing nodes via the communication medium; and
a fault detector for mutually verifying the configuration status data of the processing nodes with each other for detecting an abnormal node whose operating state is beyond the extent of either said hardware diversity mode or said software diversity mode,
wherein said fault detector comprises means for detecting configuration status data whose value differs significantly from a data set, based on a statistical test, formed by the configuration status data of all of said processing nodes and identifying one of said processing nodes which provides the detected configuration status data, and
wherein the configuration status data includes, at least, information regarding the processing node's operating state and memory usage.

23. The management node of claim 22, wherein the configurations of said processing nodes are sufficiently different from each other that a software fault is not simultaneously activated by said processing nodes.

24. The management node of claim 22, further comprising means for transmitting a report message to an external destination if an abnormal node is detected by said fault detector.

25. A fault tolerant processing node for a computing system in which said processing node is one of a plurality of processing nodes interconnected by a communication medium, wherein said processing nodes are configured either in a substantially equal configurations for parallel-running a plurality of uniquely different versions of identical application programs or in a plurality of uniquely different configurations for parallel-running a plurality of substantially equal versions of identical application programs, comprising:
means for periodically collecting configuration status data from other processing nodes of the computing system via the communication medium; and
a fault detector for verifying configuration status data of the processing node with the configuration status data collected from said other processing nodes for detecting an abnormal node whose operating state is either beyond a range of normal deviations of the uniquely different version of the application program of the node or beyond a range of normal deviations of the uniquely different configuration of the node,
wherein said fault detector comprises means for detecting configuration status data whose value differs significantly from a data set, based on statistical test, formed by the configuration status data of all of said processing nodes and identifying one of said processing nodes which provides the detected configuration status data, and
wherein the configuration status data includes, at least, information regarding the processing node's operating state and memory usage.

26. The fault tolerant processing node of claim 25, wherein the configuration of said processing node is sufficiently different from other processing nodes of the computing system so that a software fault is not simultaneously activated by said processing nodes.

27. A method of parallel-running a plurality of processing nodes interconnected by a communication medium, comprising:

a) setting said processing nodes either in substantially equal configurations or in uniquely different configurations;

b) parallel-running a plurality of uniquely different versions of identical application programs when said nodes are set in said substantially equal configurations or a plurality of substantially equal versions of said identical application programs when said nodes are set in said uniquely different configurations;

c) periodically collecting configuration status data from said processing nodes; and d) mutually verifying the collected configuration status data of the processing nodes with each other for detecting an abnormal node whose operating state is either beyond a range of normal deviations of the uniquely different version of the application program of the node or beyond a range of normal deviations of the uniquely different configuration of the node, wherein step (d) comprises detecting configuration status data whose value differs significantly from a data set, based on statistical test, formed by the configuration status data of all of said processing nodes and identifying one of said processing nodes which provides the detected configuration status data, and wherein the configuration status data includes, at least, information regarding the processing node's operating state and memory usage.

28. The method of claim 27, wherein the configurations of said processing nodes are sufficiently different from each other that a software fault is not simultaneously activated by said processing nodes.

29. The method of claim 27, further comprising transmitting a report message to an external destination if an abnormal node is detected by step (d).

30. The method of claim 27, further comprising transmitting a stop command message to one of said plurality of processing nodes if said one processing node is detected by step (d) as an abnormal node.

31. The method of claim 27, further comprising connecting a new processing node to said communication medium if an abnormal node is detected by step (d).

32. The method of claim 27, further comprising periodically collecting and verifying configuration status data from said processing nodes a predetermined number of times for detecting stability of said processing nodes if the number of said processing nodes is more than a predetermined number, selecting at least one processing node, and transmitting a stop command message to the selected at least one processing node.

33. The method of claim 32, further comprising transmitting a stop command message to one of said processing nodes if said one processing node is detected as an abnormal node while said configuration status data is periodically collected and verified for detecting said stability.

* * * * *